(12) United States Patent
Yang et al.

(10) Patent No.: US 11,491,580 B2
(45) Date of Patent: Nov. 8, 2022

(54) METHOD FOR LASER WELDING METAL WORKPIECES USING A COMBINATION OF WELD PATHS

(71) Applicant: GM GLOBAL TECHNOLOGY OPERATIONS LLC, Detroit, MI (US)

(72) Inventors: David Yang, Shanghai (CN); Wu Tao, Hubei (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 359 days.

(21) Appl. No.: 16/614,561

(22) PCT Filed: Jun. 13, 2017

(86) PCT No.: PCT/CN2017/088074
§ 371 (c)(1),
(2) Date: Nov. 18, 2019

(87) PCT Pub. No.: WO2018/227382
PCT Pub. Date: Dec. 20, 2018

(65) Prior Publication Data
US 2020/0171603 A1 Jun. 4, 2020

(51) Int. Cl.
*B23K 26/244* (2014.01)
*B23K 26/082* (2014.01)
(Continued)

(52) U.S. Cl.
CPC ........ *B23K 26/244* (2015.10); *B23K 26/0643* (2013.01); *B23K 26/0665* (2013.01);
(Continued)

(58) Field of Classification Search
CPC .. B23K 26/244; B23K 26/082; B23K 26/354; B23K 26/0643; B23K 26/0665;
(Continued)

(56) References Cited

U.S. PATENT DOCUMENTS

| 4,603,089 | A | * | 7/1986 | Bampton | ............... | B21D 47/00 |
| | | | | | | 219/121.61 |
| 4,642,446 | A | * | 2/1987 | Pennington | .......... | B23K 35/004 |
| | | | | | | 219/121.64 |

(Continued)

FOREIGN PATENT DOCUMENTS

| CN | 101382215 A | 3/2009 |
| CN | 102126084 A | 7/2011 |

(Continued)

OTHER PUBLICATIONS

International Search Report and Written Opinion for International Application No. PCT/CN2016/102669 dated Jul. 27, 2017, 7 pages.

(Continued)

*Primary Examiner* — Jimmy Chou
(74) *Attorney, Agent, or Firm* — Harness, Dickey & Pierce, P.L.C.

(57) ABSTRACT

A method of laser welding together two or more overlapping metal workpieces (12, 14, or 12, 150, 14) included in a welding region (16) of a workpiece stack-up (10) involves advancing a beam spot (44) of a laser beam (24) relative to a top surface (20) of the workpiece stack-up along a first weld path (72) in a first direction (74) to form an elongated melt puddle (76) and, then, advancing the beam spot (44) of the laser beam (24) along a second weld path (78) in a second direction (80) that is opposite of the first direction while the elongated melt puddle is still in a molten state. The first weld path and the second weld path overlap so that the beam spot of the laser beam is conveyed through the elongated melt puddle when the beam spot is advanced along the second weld path.

19 Claims, 8 Drawing Sheets

(51) Int. Cl.
- *B23K 26/354* (2014.01)
- *B23K 26/06* (2014.01)
- *B23K 26/08* (2014.01)
- *B23K 26/322* (2014.01)
- B23K 103/08 (2006.01)
- B23K 103/10 (2006.01)
- B23K 103/04 (2006.01)

(52) U.S. Cl.
CPC ........ *B23K 26/082* (2015.10); *B23K 26/0876* (2013.01); *B23K 26/322* (2013.01); *B23K 26/354* (2015.10); *B23K 2103/04* (2018.08); *B23K 2103/10* (2018.08); *B23K 2103/15* (2018.08)

(58) Field of Classification Search
CPC .............. B23K 26/0876; B23K 26/322; B23K 2103/15; B23K 2103/10; B23K 2103/04
USPC .................................................... 219/121.64
See application file for complete search history.

(56) References Cited

U.S. PATENT DOCUMENTS

| | | | |
|---|---|---|---|
| 5,142,119 A * | 8/1992 | Hillman | B23K 26/123 219/121.64 |
| 5,183,991 A * | 2/1993 | Arai | B23K 26/323 219/121.64 |
| 5,183,992 A * | 2/1993 | Bilge | B23K 26/32 219/121.64 |
| 5,343,014 A * | 8/1994 | Ogino | B23K 26/32 219/121.64 |
| 6,359,252 B1 * | 3/2002 | Sanjeu | B23K 15/0053 219/121.64 |
| 6,410,882 B1 | 6/2002 | Okada | |
| 6,608,278 B1 * | 8/2003 | Xie | B23K 26/0608 219/121.64 |
| 7,015,417 B2 * | 3/2006 | Takikawa | B23K 9/173 219/137 WM |
| 7,977,620 B2 | 7/2011 | Nishio et al. | |
| 8,481,883 B2 | 7/2013 | Yang et al. | |
| 8,890,022 B2 * | 11/2014 | Beck | B23K 26/244 219/121.64 |
| 9,138,827 B2 * | 9/2015 | Lee | B23K 26/32 |
| 9,586,282 B2 | 3/2017 | Yang | |
| 9,873,168 B2 * | 1/2018 | Lee | B23K 26/244 |
| 9,944,048 B2 * | 4/2018 | Nishikawa | B23K 26/244 |
| 10,005,156 B2 | 6/2018 | Ogura et al. | |
| 10,155,285 B2 * | 12/2018 | Fujiwara | B25J 11/005 |
| 10,195,689 B2 | 2/2019 | Yang et al. | |
| 10,569,477 B2 | 2/2020 | Zhang et al. | |
| 10,675,713 B2 | 6/2020 | Yang et al. | |
| 10,688,595 B2 | 6/2020 | Yang et al. | |
| 10,946,479 B2 | 3/2021 | Yang et al. | |
| 10,953,494 B2 | 3/2021 | Yang et al. | |
| 10,953,497 B2 | 3/2021 | Wang et al. | |
| 11,148,226 B2 * | 10/2021 | Yang | B23K 26/22 |
| 2003/0217993 A1 | 11/2003 | Stol et al. | |
| 2004/0031561 A1 * | 2/2004 | Ely | B23K 26/323 156/272.8 |
| 2004/0173587 A1 * | 9/2004 | Musselman | B23K 26/0093 219/121.64 |
| 2004/0200813 A1 * | 10/2004 | Alips | B23K 26/067 219/121.63 |
| 2006/0011592 A1 * | 1/2006 | Wang | B23K 26/123 219/121.64 |
| 2006/0175315 A1 | 8/2006 | Wang | |
| 2006/0196856 A1 * | 9/2006 | Onose | B23K 26/242 219/121.63 |
| 2006/0275623 A1 | 12/2006 | Takeda et al. | |
| 2006/0278618 A1 * | 12/2006 | Forrest | B23K 26/0608 219/121.64 |
| 2007/0007254 A1 * | 1/2007 | Wang | B23K 28/02 219/91.22 |
| 2007/0084835 A1 | 4/2007 | Dinauer et al. | |
| 2007/0095802 A1 * | 5/2007 | Chen | B23K 26/0861 219/121.62 |
| 2009/0220815 A1 * | 9/2009 | Canourgues | B23K 26/32 428/583 |
| 2009/0236321 A1 * | 9/2009 | Hayashi | H01R 4/029 219/121.64 |
| 2009/0266801 A1 | 10/2009 | Oku et al. | |
| 2009/0283505 A1 * | 11/2009 | Naumovski | C10M 169/04 219/121.64 |
| 2010/0072178 A1 * | 3/2010 | Ramsayer | B23K 26/082 219/121.64 |
| 2011/0139753 A1 * | 6/2011 | Lee | B23K 26/244 219/121.64 |
| 2011/0215554 A1 | 9/2011 | Mayville | |
| 2012/0160815 A1 * | 6/2012 | Hayashimoto | B23K 26/244 219/121.64 |
| 2012/0211474 A1 * | 8/2012 | Hayashimoto | B23K 26/28 219/121.64 |
| 2013/0008880 A1 | 1/2013 | Ota | |
| 2013/0087540 A1 * | 4/2013 | Gu | B23K 26/354 219/121.64 |
| 2013/0119025 A1 | 5/2013 | Lee et al. | |
| 2013/0168371 A1 | 7/2013 | Furusako et al. | |
| 2014/0003860 A1 * | 1/2014 | Evangelista | B23K 9/235 403/270 |
| 2014/0124488 A1 * | 5/2014 | Lee | B23K 26/244 219/121.64 |
| 2014/0144893 A1 * | 5/2014 | Yang | B23K 9/0026 219/121.64 |
| 2014/0360986 A1 | 12/2014 | Sigler et al. | |
| 2015/0306708 A1 * | 10/2015 | Pape | B23K 26/0876 219/121.64 |
| 2015/0336212 A1 * | 11/2015 | Hisada | B23K 26/082 219/121.64 |
| 2015/0364891 A1 | 12/2015 | Kojima et al. | |
| 2016/0052091 A1 | 2/2016 | Uchida et al. | |
| 2016/0318127 A1 * | 11/2016 | Gu | B23K 26/144 |
| 2016/0332256 A1 * | 11/2016 | Gu | B23K 26/144 |
| 2017/0001261 A1 * | 1/2017 | Fujiwara | B23K 26/244 |
| 2017/0001262 A1 | 1/2017 | Song et al. | |
| 2017/0008124 A1 | 1/2017 | Fujimoto et al. | |
| 2017/0050269 A1 | 2/2017 | Nakagawa et al. | |
| 2017/0066076 A1 * | 3/2017 | Li | B23K 26/60 |
| 2017/0080525 A1 | 3/2017 | Noda et al. | |
| 2017/0095886 A1 * | 4/2017 | Gu | B23K 26/322 |
| 2017/0232553 A1 * | 8/2017 | Sievi | B23K 26/0869 219/121.64 |
| 2017/0239750 A1 | 8/2017 | Yang et al. | |
| 2017/0259373 A1 | 9/2017 | Albert et al. | |
| 2017/0274473 A1 | 9/2017 | Naito et al. | |
| 2018/0009060 A1 | 1/2018 | Yang et al. | |
| 2018/0045232 A1 | 2/2018 | Capostagno et al. | |
| 2018/0079031 A1 * | 3/2018 | Takebe | B23K 26/082 |
| 2018/0111226 A1 * | 4/2018 | Wang | B23K 26/26 |
| 2018/0214983 A1 | 8/2018 | Yang et al. | |
| 2018/0304405 A1 * | 10/2018 | Yang | B23K 26/22 |
| 2018/0326674 A1 | 11/2018 | Yang et al. | |
| 2019/0061055 A1 | 2/2019 | Yang et al. | |
| 2019/0224781 A1 | 7/2019 | Yang et al. | |
| 2019/0240780 A1 | 8/2019 | Yang et al. | |
| 2019/0375046 A1 * | 12/2019 | Grimm | B23K 26/0622 |
| 2020/0047285 A1 | 2/2020 | Yang et al. | |
| 2020/0094350 A1 | 3/2020 | Pan et al. | |
| 2020/0101563 A1 | 4/2020 | Tao et al. | |
| 2020/0114469 A1 | 4/2020 | Tao et al. | |
| 2020/0316713 A1 | 10/2020 | Yang et al. | |
| 2020/0316714 A1 * | 10/2020 | Yang | B23K 26/322 |
| 2020/0384574 A1 * | 12/2020 | Nishii | B23K 26/26 |

FOREIGN PATENT DOCUMENTS

| | | |
|---|---|---|
| CN | 102764934 A | 11/2012 |
| CN | 102834216 A | 12/2012 |
| CN | 103056523 A | 4/2013 |
| CN | 103100795 A | 5/2013 |
| CN | 103480966 A | 1/2014 |

(56) References Cited

FOREIGN PATENT DOCUMENTS

| | | |
|---|---|---|
| CN | 102642088 B | 12/2014 |
| CN | 105073331 A | 11/2015 |
| CN | 106029291 A | 10/2016 |
| CN | 106312315 A | 1/2017 |
| CN | 110392620 A | 10/2019 |
| CN | 110914014 A | 3/2020 |
| CN | 110023026 B | 3/2021 |
| DE | 19947104 A1 | 4/2000 |
| DE | 102010060983 A1 | 6/2011 |
| DE | 102015001151 A1 | 7/2015 |
| DE | 102016107581 B3 | 4/2017 |
| DE | 112016007229 T5 | 6/2019 |
| DE | 112017006781 T5 | 10/2019 |
| DE | 112017007470 T5 | 1/2020 |
| EP | 0327320 A1 | 8/1989 |
| EP | 1423230 A1 | 6/2004 |
| EP | 1688209 A2 | 8/2006 |
| JP | S61199591 U | 12/1986 |
| JP | H09225664 A | 9/1997 |
| JP | 2003136262 A | 5/2003 |
| JP | 2005246440 A | 9/2005 |
| JP | 2009262186 A | 11/2009 |
| JP | 2010023047 A | 2/2010 |
| JP | 2012115876 A | 6/2012 |
| JP | 2012228717 A | 11/2012 |
| JP | 2012240086 A | 12/2012 |
| WO | WO-2012050097 A1 | 4/2012 |
| WO | 2013110214 A1 | 8/2013 |
| WO | WO-2015104781 A1 | 7/2015 |
| WO | WO-2015119159 A1 | 8/2015 |
| WO | WO-2015129231 A1 | 9/2015 |
| WO | WO-2015159852 A1 | 10/2015 |
| WO | 2016032416 A1 | 3/2016 |
| WO | WO-2016043278 A1 | 3/2016 |
| WO | WO-2016058619 A1 | 4/2016 |
| WO | WO-2016107564 A1 | 7/2016 |
| WO | 2016192039 A1 | 12/2016 |
| WO | 2017035728 A1 | 3/2017 |
| WO | 2017035729 A1 | 3/2017 |
| WO | 2017075808 A1 | 5/2017 |
| WO | 2017156723 A1 | 9/2017 |
| WO | 2017173650 A1 | 10/2017 |
| WO | 2017173833 A1 | 10/2017 |
| WO | 2017177410 A1 | 10/2017 |
| WO | 2017177411 A1 | 10/2017 |
| WO | WO-2017201668 A1 | 11/2017 |
| WO | WO-2018072163 A1 | 4/2018 |

OTHER PUBLICATIONS

First Office Action for Chinese Patent Application No. 201680090200.8 dated Jul. 3, 2020 with English language machine translation, 11 pages.
First Office Action for Chinese Patent Application No. 201780091977.0 dated Nov. 19, 2020 with correspondence dated Dec. 7, 2020 from China Patent Agent (H.K.) Ltd. summarizing contents, 11 pages.
P. Kah, J. Lu, J Martikainen and R. Suoranta, "Remote Laser Welding with High Power Fiber Lasers," Engineering, vol. 5 No. 9, 2013, pp. 700-706. doi: 10.4236/eng.2013.59083 (Year: 2013).
International Search Report and Written Opinion for application No. PCT/CN2017/088074 dated Feb. 24, 2018, 7 pages.
International Search Report and Written Opinion for International Application No. PCT/CN2017/000147 dated Nov. 8, 2017, 7 pages.
First Office Action for Chinese Patent Application No. 201780086172.7 dated Sep. 10, 2020 with English language machine translation, 25 pages.
Second Office Action for Chinese Patent Application No. 201780086172.7 dated Jun. 10, 2021 with correspondence dated Jun. 17, 2021 from China Patent Agent (H.K.) Ltd. summarizing contents, 12 pages.
Evertsson et al., The thickness of native oxides on aluminum alloys and single crystals, 2015 (Year: 2015).

\* cited by examiner

METHOD FOR LASER WELDING METAL WORKPIECES USING A COMBINATION OF WELD PATHS

TECHNICAL FIELD

The technical field of this disclosure relates generally to a method for laser welding together metal workpieces such a workpiece stack-up comprised of two or more steel workpieces, a workpiece comprised of two or more aluminum workpieces, or a workpiece stack-up comprised of two or more magnesium workpieces.

INTRODUCTION

Laser welding is a metal joining process in which a laser beam is directed at an assembly of stacked-up metal workpieces to provide a concentrated heat source capable of effectuating a weld joint between the constituent metal workpieces. In general, complimentary flanges or other bonding regions of two or more metal workpieces are first aligned, fitted, and stacked relative to one another such that their faying surfaces overlap and confront to establish one or more faying interfaces. A laser beam is then directed at an accessible top surface of the workpiece stack-up within a welding region spanned by the overlapping portion of the workpieces. The heat generated from the absorption of energy from the laser beam initiates melting of the metal workpieces and establishes a molten metal weld pool within the workpiece stack-up. And, if the power density of the laser beam is high enough, a keyhole is produced beneath a beam spot of the laser beam within the molten metal weld pool. A keyhole is a column of vaporized metal, which may include plasma, derived from the metal workpieces. The keyhole is an effective absorber of energy from the laser beam, thus allowing for deep and narrow penetration of molten workpiece metal into the stack-up.

The molten metal weld pool and, if present, the keyhole, are created in very short order once the laser beam impinges the top surface of the workpiece stack-up. After the metal workpieces are initially melted, the beam spot of the laser beam may be advanced relative to the top surface of the workpiece stack-up, which has conventionally involved moving the laser beam along a beam travel pattern of a relatively simple or complex geometrical profile as projected onto the top surface of the stack-up. As the laser beam is advanced along the top surface of the stack-up, molten workpiece metal from the weld pool flows around and behind the advancing beam spot within the workpiece stack-up. This penetrating molten workpiece metal eventually cools and solidifies in the wake of the advancing laser beam into consolidated resolidified metal workpiece material. The transmission of the laser beam at the top surface of the workpiece stack-up is eventually ceased once the laser beam has finished tracking the beam travel pattern, at which time the keyhole collapses, if present, and any molten workpiece metal still remaining within the stack-up solidifies. The consolidated resolidified workpiece material obtained by operation of the laser beam constitutes a laser weld joint that autogenously fusion welds the overlapping metal workpieces together.

Many industries use laser welding as part of their manufacturing practice including the automotive, aviation, maritime, railway, and building construction industries, among others. Laser welding is an attractive joining process because it requires only single side access, can be practiced with reduced flange widths, and results in a relatively small heat-affected zone within the stack-up assembly that minimizes thermal distortion in the metal workpieces. In the automotive industry, for example, laser welding can be used to join together metal workpieces during the manufacture of the body-in-white (BIW) as well as finished hang-on parts that are installed on the BIW prior to painting. Some specific instances where laser welding may be used include the construction and attachment of load-bearing body structures within the BIW such as rail structures, rockers, A-, B-, and C-pillars, and underbody cross-members. Other specific instances where laser welding may also be used include non-load-bearing attachments within the BIW, such as the attachment of a roof to a side panel, and to join overlying flanges encountered in the construction of the doors, hood, and trunk.

The practice of laser welding can present challenges for certain types of metal workpieces. For example, steel workpieces often include a coating of a zinc-based material for corrosion protection. Zinc has a boiling point of about 906° C., while the melting point of the base steel substrate it coats is typically 1300° C. or greater. Thus, when a steel workpiece that includes a zinc-based surface coating is laser welded, high-pressure zinc vapors are readily produced at the surfaces of the steel workpiece and have a tendency to disrupt the laser welding process. In particular, the zinc vapors produced at the faying interface(s) of the steel workpieces are forced to diffuse into and through the molten workpiece metal created by the laser beam unless an alternative escape outlet is provided through the workpiece stack-up. When an adequate escape outlet is not provided, zinc vapors may remain trapped in the molten workpiece metal as it cools and solidifies, which may lead to defects in the resulting weld joint—such as entrained porosity—as well as other weld joint discrepancies such as spatter, blowholes, and undercut joints. These weld joint deficiencies, if sever enough, can unsatisfactorily degrade the mechanical properties of the laser weld joint.

To deter high-pressure zinc vapors from diffusing into the molten workpiece metal, conventional manufacturing procedures have called for laser scoring or mechanical dimpling at least one of the confronting steel workpieces at each faying interface where a zinc-based coating is present before laser welding is conducted. The laser scoring or mechanical dimpling processes create spaced apart protruding features that impose a gap of about 0.1-0.2 millimeters between the faying surfaces, which provides an escape path to guide zinc vapors along the established faying interface and away from the weld location. But the formation of these protruding features adds an additional step to the overall laser welding process and is believed to contribute to the occurrence of undercut weld joints.

Light metal workpieces such as aluminum and magnesium workpieces are also good candidates for many automobile component parts and structures due to their high strength-to-weight ratios and their ability to improve vehicle fuel economy. Both aluminum and magnesium workpieces, however, typically include a surface oxide coating comprised of a refractory oxide material. To be sure, the surface oxide coating found on aluminum and magnesium workpieces is typically a native refractory oxide coating that is thermally and electrically insulating as well as mechanically tough. Because the surface oxide coating is difficult to break down and is a poor conductor of heat, it can suppress the rate of heat transfer into the underlying bulk aluminum or magnesium, at least at the outset of the laser welding process. Additionally, the surface oxide coating and moisture from the immediate surrounding vicinity may be a source of hydrogen and/or water vapor when the surface oxide coating is heated by the laser beam to elevated temperatures. Hydrogen, in particular, has a relatively high solubility in both molten aluminum and molten magnesium, but not in solid aluminum and magnesium. To that end, the localized generation of hydrogen in close proximity to the laser beam, and the presence of oxide coating fragments themselves in the molten workpiece metal, can lead to porosity within the final solidified laser weld joint as hydrogen is rejected from the molten workpiece metal as it cools and solidifies.

SUMMARY OF THE DISCLOSURE

An embodiment of a method of laser welding a workpiece stack-up that includes at least two overlapping metal workpieces may include several steps. In one step, a workpiece stack-up is provided that includes overlapping metal workpieces. The overlapping metal workpieces comprise at least a first metal workpiece and a second metal workpiece that overlaps with the first metal workpiece in a welding region. The first metal workpiece provides a top surface of the workpiece stack-up within the welding region and the second metal workpiece provides a bottom surface of the workpiece stack-up within the welding region. All of the overlapping metal workpieces in the workpiece stack-up are steel workpieces, aluminum workpieces, or magnesium workpieces. In another step, a laser beam is directed at the top surface of the workpiece stack-up within the welding region. The laser beam has a beam spot at the top surface of the workpiece stack-up and is maneuverable such that the beam spot can be moved relative to the top surface of the workpiece stack-up. In still another step, a laser weld joint is formed that extends from the first metal workpiece into the second metal workpiece to autogenously fusion weld the overlapping metal workpieces of the workpiece stack-up together. Formation of the laser weld joint includes advancing the beam spot of the laser beam relative to the top surface of the workpiece stack-up along a first weld path in a first direction to form an elongated melt puddle and, then, advancing the beam spot of the laser beam along a second weld path in a second direction that is opposite of the first direction while the elongated melt puddle is still in a molten state. The first weld path and the second weld path overlap so that the beam spot of the laser beam is conveyed through the elongated melt puddle when the beam spot is advanced along the second weld path.

The aforementioned embodiment of the laser welding method may be practiced on different types of workpiece stack-ups. For example, the first metal workpiece may have an exterior outer surface and a first faying surface, and the second metal workpiece may have an exterior outer surface and a second faying surface. Additionally, the exterior outer surface of the first metal workpiece may provide the top surface of the workpiece stack-up and the exterior outer surface of the second metal workpiece may provide the bottom surface of the workpiece stack-up. The first and second faying surfaces of the first and second metal workpieces, moreover, may overlap and confront to establish a faying interface.

In another example, the first metal workpiece may have an exterior outer surface and a first faying surface, and the second metal workpiece may have an exterior outer surface and a second faying surface. Additionally, the exterior outer surface of the first metal workpiece may provide the top surface of the workpiece stack-up and the exterior outer surface of the second metal workpiece may provide the bottom surface of the workpiece stack-up. The workpiece stack-up may further comprise a third metal workpiece situated between the first and second metal workpieces. The third metal workpiece may have opposed third and fourth faying surfaces. The third faying surface may overlap and confront the first faying surface of the first metal workpiece to establish a first faying interface and the fourth faying surface may overlap and confront the second faying surface of the second metal workpiece to establish a second faying interface.

The composition of the metal workpieces included in the workpiece stack-up can also vary. In one scenario, all of the metal workpieces in the workpiece stack-up are steel workpieces. Furthermore, when all of the metal workpieces are steel workpieces, at least one of the steel workpieces included in the workpiece stack-up may comprise a zinc-based surface coating. In another scenario, all of the metal workpieces in the workpiece stack-up are aluminum workpieces.

The aforementioned embodiment of the laser welding method may include additional steps or may be further defined. In one implementation, the beam spot of the laser beam may be advanced along the first weld path from a first fixed location to a spaced apart second fixed location, and then may be advanced along the second weld path from the second fixed location to the first fixed location. In another implementation, the first weld path may include a mean profile line and lateral variations above and below the mean profile line. The first weld path may further have a surface area that covers a swath of the top surface of the workpiece stack-up defined by a product of a length dimension of the first weld path and a width dimension of the first weld path. In still other implementations, the first weld path may be a periodic waveform, a band of a series of offset intersecting circles, or a band of a continuous series of loops. And, in other implementations, the second weld may be linear and contained within the surface area of the first weld path.

The method may include the additional step of advancing the laser beam along a third weld path, which overlaps with each of the first weld path and the second weld path, to provide the laser weld joint with a top surface having a surface roughness (Ra) of 15 µm or less. In that regard, the laser beam may be advanced along the third weld path, without a keyhole being present, while the elongated melt puddle is still in a molten state so that the laser beam impinges an upper surface of the elongated melt puddle and introduces heat into an upper region of the elongated melt puddle to slow the rate of cooling of the upper surface of the elongated melt puddle so that, upon solidification, the top surface of the laser weld joint is rendered smooth. Or, as another option, the laser beam may be advanced along the third weld path after the elongated melt puddle has fully solidified into the laser weld joint so that the laser beam impinges the top surface of the laser weld joint and momentarily remelts a top region of the laser weld joint so that, upon resolidification, the top surface of the laser weld joint is rendered smooth.

Another embodiment of method of laser welding a workpiece stack-up that includes at least two overlapping metal workpieces includes several steps. In one step, a workpiece stack-up is provided that includes overlapping metal workpieces. The overlapping metal workpieces comprise at least a first metal workpiece and a second metal workpiece that overlaps with the first metal workpiece in a welding region. The first metal workpiece provides a top surface of the workpiece stack-up within the welding region and the second metal workpiece provides a bottom surface of the workpiece stack-up within the welding region. All of the overlapping metal workpieces in the workpiece stack-up are steel workpieces or aluminum workpieces. In another step, a remote laser welding apparatus is operated to direct a laser beam at the top surface of the workpiece stack-up within the welding region. The laser beam has a beam spot at the top surface of the workpiece stack-up. In yet another step, the remote laser welding apparatus is operated to advance the beam spot of the laser beam relative to the top surface of the workpiece stack-up along a first weld path in a first direction to form an elongated melt puddle. The first weld path has a surface area that covers a swath of the top surface of the workpiece stack-up. In still another step, the remote laser welding apparatus is operated to advance the beam spot of the laser beam along a second weld path in a second direction that is opposite of the first direction while the elongated melt puddle is still in a molten state so that the beam spot of the laser beam is conveyed back through the elongated melt puddle. The second weld path is contained within the surface area of the first weld path. And, in still another step, the laser beam is removed to allow the elongated melt puddle to solidify into a laser weld joint that extends from the first metal workpiece into the second metal workpiece to autogenously fusion weld the overlapping metal workpieces of the workpiece stack-up together.

The aforementioned embodiment of the laser welding method may include additional steps or may be further defined. For example, the metal workpieces included in the workpiece stack-up may include only the first and second metal workpieces, or the metal workpieces included in the workpiece stack-up may further include a third metal workpiece situated between the first and second metal workpieces within the welding region. As another example, the remote laser welding apparatus may be operated to advance the beam spot of the laser beam along a third weld path, either before or after the elongated melt puddle has solidified into the laser weld joint, to provide the laser weld joint with a smooth top surface. As yet another example, the first weld path may be a periodic waveform and the second weld path may be linear. Still further, in yet another example, the elongated melt puddle may be enlarged when the beam spot of the laser beam is advanced along the second weld path.

Another embodiment of a method of laser welding a workpiece stack-up that includes at least two overlapping metal workpieces includes several steps. In one step, a workpiece stack-up is provided that includes overlapping metal workpieces. The overlapping metal workpieces comprise at least a first metal workpiece and a second metal workpiece that overlaps with the first metal workpiece in a welding region. The first metal workpiece provides a top surface of the workpiece stack-up within the welding region and the second metal workpiece provides a bottom surface of the workpiece stack-up within the welding region. All of the overlapping metal workpieces in the workpiece stack-up are steel workpieces, aluminum workpieces, or magnesium workpieces. In another step, a beam spot of a laser beam is advanced relative to the top surface of the workpiece stack-up along a first weld path in a first direction to form an elongated melt puddle. The first weld path includes a mean profile line and lateral variations above and below the mean profile line and further has a surface area that covers a swath of the top surface of the workpiece stack-up. In yet another step, the beam spot of the laser beam is advanced along a second weld path in a second direction that is opposite of the first direction while the elongated melt puddle is still in a molten state to convey the beam spot back through the elongated melt puddle. The second weld path overlaps with the first weld path so that at least 80% of the second weld path is contained within the surface area of the first weld path. And, in still another step, the laser beam is removed to allow the elongated melt puddle to fully solidify into a laser weld joint that extends from the first metal workpiece into the second metal workpiece to autogenously fusion weld the overlapping metal workpieces of the workpiece stack-up together. The laser weld joint has a top surface that has a surface roughness (Ra) of 10 μm or less.

DETAILED DESCRIPTION

Figures 1, 2:
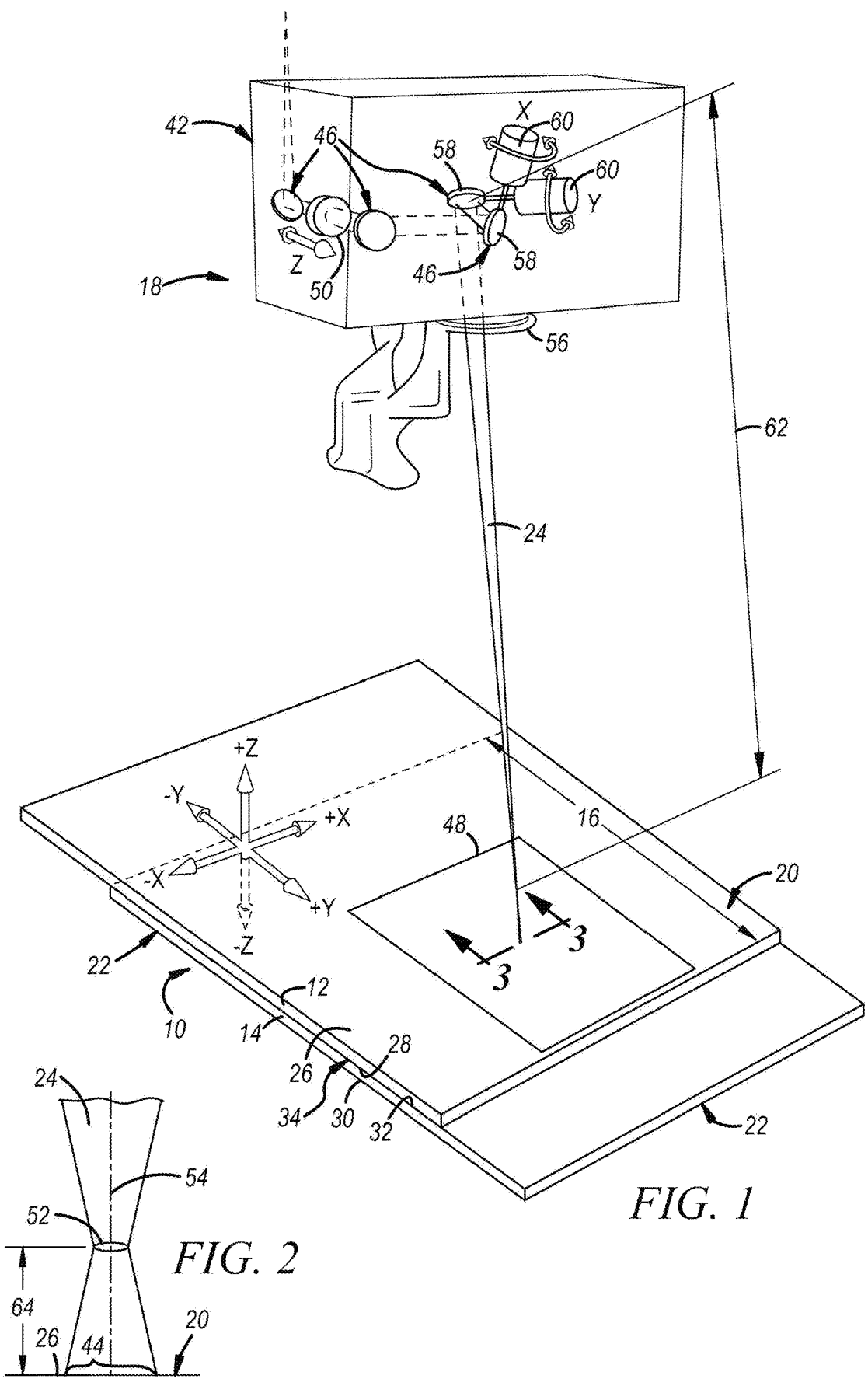
FIG. 1 is a general illustration of a workpiece stack-up that includes two overlapping metal workpieces along with a remote laser welding apparatus that can carry out the disclosed laser welding method.
FIG. 2 is a magnified view of the laser beam depicted in FIG. 1 showing a focal point and a longitudinal axis of the laser beam.

The disclosed method of laser welding two or more stacked-up metal workpieces involves advancing a laser beam—and, in particular, the beam spot of the laser beam—relative to a top surface of the workpiece stack-up along multiple overlapping weld paths during formation of the final laser weld joint. Each of the multiple weld paths may serve a particular function when traced by the laser beam that contributes to the integrity and quality of the laser weld joint including, for example, initially forming penetrating molten workpiece material in the form of an elongated melt puddle, working the elongated melt puddle once it has been formed, and optionally conditioning the melt puddle and/or the solidified laser weld joint to provide the laser weld joint with a smooth top surface. By carrying out the laser welding method in this way—as opposed to advancing the laser beam once along a single beam travel pattern—the laser weld joint can be formed in a more deliberate and efficient manner using each of the multiple traced weld paths to collectively minimize the occurrence of weld defects, such as porosity, as well as other laser welding imperfections.

The advancement of the laser beam along the multiple weld paths as needed to form the laser weld joint may be performed by a remote laser welding apparatus that includes a scanning optic laser. The scanning optic laser head may house indexible optical components that can move the beam spot of the laser beam relative to and along the top surface of the workpiece stack-up in a wide variety of simple and complex geometric shapes or weld paths while also being able to change the focal position of the laser beam if needed. The same type of laser beam advancement may also be carried out a conventional laser welding apparatus such as, for example, an apparatus in which a fixed laser head is carried by a high-speed CNC machine, as well as other types of laser welding apparatuses that possess comparable functionalities. The laser beam employed to form the laser weld joint may be a solid-state laser beam or a gas laser beam depending on the characteristics of the metal workpieces being joined and the laser welding mode (conduction, keyhole, etc.) desired to be practiced. Some notable solid-state lasers that may be used are a fiber laser, a disk laser, a direct diode laser, and a Nd:YAG laser, and a notable gas laser that may be used is a $CO_2$ laser, although other types of lasers may certainly be used.

The disclosed method of laser welding together two or more metal workpieces can be performed on a variety of workpiece stack-up configurations. For example, the disclosed method may be used in conjunction with a "2T" workpiece stack-up that includes two overlapping metal workpieces, or it may be used in conjunction with a "3T" workpiece stack-up that includes three overlapping metal workpieces. Still further, in some instances, the disclosed method may be used in conjunction with a "4T" workpiece stack-up (not shown) that includes four overlapping metal workpieces. The two or more metal workpieces included in the workpiece stack-up may all be steel workpieces, may all be aluminum workpieces, or may all be magnesium workpieces, and they need not necessarily have the same composition (within the same base metal class) or have the same thickness as the others in the stack-up. The disclosed method is carried out in essentially the same way to achieve the same results regardless of whether the workpiece stack-up includes two overlapping metal workpieces or more than two overlapping metal workpieces. Any differences in workpiece stack-up configurations can be easily accommodated by adjusting the characteristics of the operating laser beam.

Referring now generally to FIG. 1, a workpiece stack-up 10 is shown in which the stack-up 10 includes at least a first metal workpiece 12 and a second metal workpiece 14 that overlap to define a welding region 16. A remote laser welding apparatus 18 that can perform the disclosed workpiece joining method is also shown. Within the confines of the welding region 16, the first and second metal workpieces 12, 14 provide a top surface 20 and a bottom surface 22, respectively, of the workpiece stack-up 10. The top surface 20 of the workpiece stack-up 10 is made available to the remote laser welding apparatus 18 and is accessible by a laser beam 24 emanating from the remote laser welding apparatus 18. And since only single side access is needed to conduct laser welding, there is no need for the bottom surface 22 of the workpiece stack-up 10 to be made accessible in the same way. The terms "top surface" and "bottom surface" as used herein are relative designations that identify the surface of the stack-up 10 (top surface) that is more proximate to and facing the remote laser welding apparatus 18 and the surface of the stack-up 10 (bottom surface) that is facing in the opposite direction.

The workpiece stack-up 10 may include only the first and second metal workpieces 12, 14, as shown in FIG. 1-21. Under these circumstances, and as shown best in FIG. 3, the first metal workpiece 12 includes an exterior outer surface 26 and a first faying surface 28, and the second metal workpiece 14 includes an exterior outer surface 30 and a second faying surface 32. The exterior outer surface 26 of the first metal workpiece 12 provides the top surface 20 of the workpiece stack-up 10 and the exterior outer surface 30 of the second metal workpiece 14 provides the oppositely-facing bottom surface 22 of the stack-up 10. And, since the two metal workpieces 12, 14 are the only workpieces present in the workpiece stack-up 10, at least in this embodiment, the first and second faying surfaces 28, 32 of the first and second metal workpieces 12, 14 overlap and confront within the welding region 16 to establish a faying interface 34. In other embodiments, one of which is described below in connection with FIGS. 22-23, the workpiece stack-up 10 may include an additional third metal workpiece disposed between the first and second metal workpieces 12, 14 to provide the stack-up 10 with three metal workpieces within the welding region 16 instead of two.

The term "faying interface" is used broadly in the present disclosure and is intended to encompass a wide range of overlapping relationships between the confronting first and second faying surfaces 28, 32 of the first and second metal workpieces 12, 14 that can accommodate the practice of laser welding. For instance, the faying surfaces 28, 32 may establish the faying interface 34 by being in direct or indirect contact. The faying surfaces 28, 32 are in direct contact with each other when they physically abut and are not separated by a discrete intervening material layer or gaps that fall outside of normal assembly tolerance ranges. The faying surfaces 28, 32 are in indirect contact when they are separated by a discrete intervening material layer such as a sealer or adhesive—and thus do not experience the type of interfacial abutment that typifies direct contact—yet are in close enough proximity that laser welding can be practiced. As another example, the faying surfaces 28, 32 may establish the faying interface 34 by being separated by imposed gaps. Such gaps may be imposed between the faying surfaces 28, 32 by creating protruding features on one or both of the faying surfaces 28, 32 through laser scoring, mechanical dimpling, or otherwise. The protruding features maintain intermittent contact points between the faying surfaces 28, 32 that keep the surfaces 28, 32 spaced apart outside of and around the contact points by up to 1.0 mm.

Figure 3:
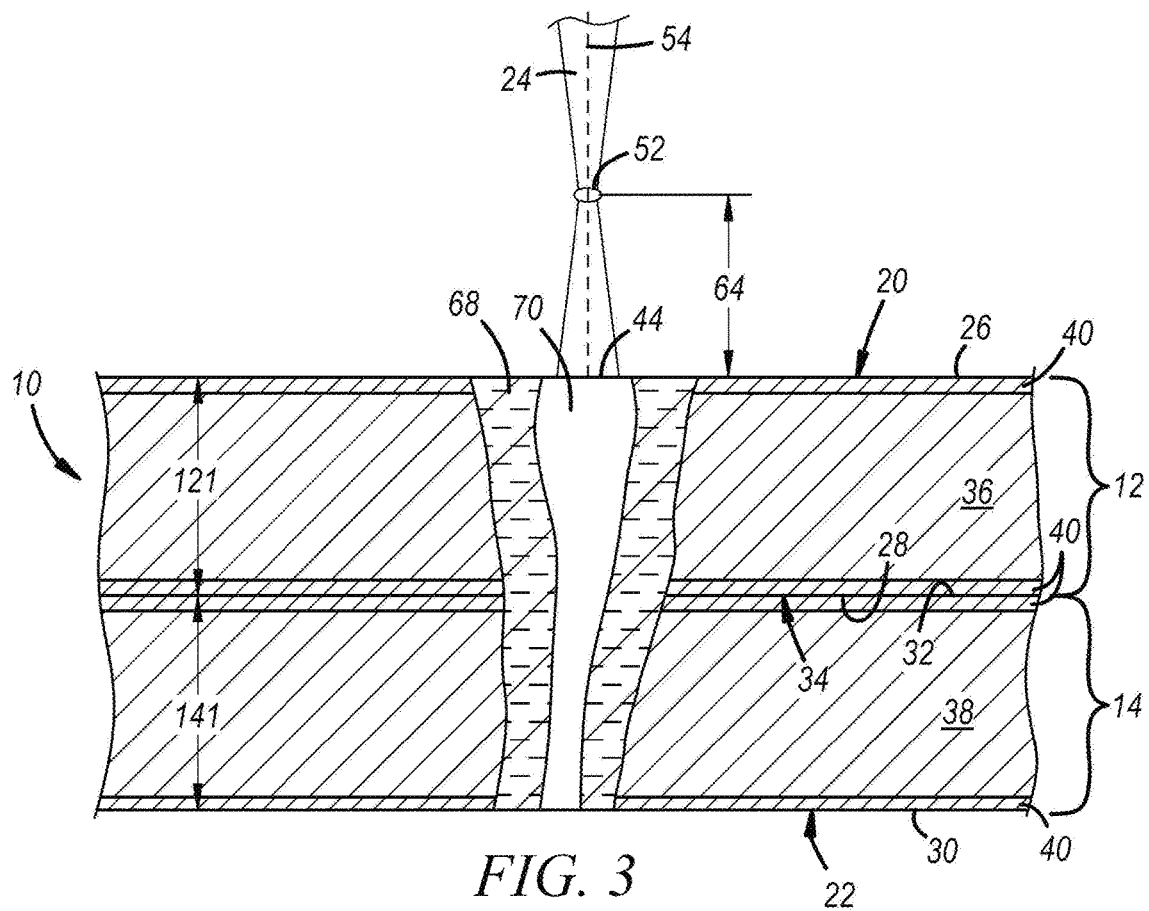
FIG. 3 is a cross-sectional view of the workpiece stack-up shown in FIG. 1 along with a keyhole and a surrounding molten weld pool that have been produced upon directing the laser beam at the top surface of the workpiece stack-up so that the laser beam impinges the top surface.

Referring still to FIG. 3, the first metal workpiece 12 includes a first metal base layer 36 and the second metal workpiece 14 includes a second metal base layer 38. The first and second metal base layers 36, 38 may all be composed of steel, aluminum, or magnesium; that is, the first and second metal base layers 36, 38 are both composed of steel, both composed of aluminum, or both composed of magnesium. At least one of the first or second metal base layers 36, 38, and usually both of the metal base layers 36, 38, includes a surface coating 40. The surface coating(s) 40 may be employed on one or both of the metal base layers 36, 38 for various reasons including corrosion protection, strength enhancement, and/or to improve processing, among other reasons, and the composition of the surface coating(s) 40 is based largely on the composition of the underlying metal base layers 36, 38. Taking into the account the thicknesses of the metal base layers 36, 38 and their optional surface coatings 40, each of a thickness 121 of the first metal workpiece 12 and a thickness 141 of the second metal workpiece 14 preferably ranges from 0.4 mm to 6.0 mm at least within the welding region 16. The thicknesses 121, 141 of the first and second metal workpieces 12, 14 may be the same or different from each other.

The metal base layers 36, 38 may assume any of a wide variety of metal forms and compositions that fall within the broadly-recited base metal groups of steel, aluminum, or magnesium. For instance, if composed of steel, each of the metal base layers 36, 38 (referred to for the moment as the first and second steel base layers 36, 38) may be separately composed of any of a wide variety of steels including a low carbon (mild) steel, interstitial-free (IF) steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the workpiece(s) 12, 14 include press-hardened steel (PHS). Moreover, each of the first and second steel base layers 36, 38 may have been treated to obtain a particular set of mechanical properties, including being subjected to heat-treatment processes such as annealing, quenching, and/or tempering. The first and second steel base layers 36, 38 may be hot or cold rolled to their final thicknesses and may be pre-fabricated to have a particular profile suitable for assembly into the workpiece stack-up 10.

The surface coating 40 present on one or both of the steel base layers 36, 38 is preferably comprised of a zinc-based material or an aluminum-based material. Some examples of a zinc-based material include zinc or a zinc alloy such as a zinc-nickel alloy or a zinc-iron alloy. One particularly preferred zinc-iron alloy that may be employed has a bulk average composition that includes 8 wt % to 12 wt % iron and 0.5 wt % to 4 wt % aluminum with the balance (in wt %) being zinc. A coating of a zinc-based material may be applied by hot-dip galvanizing (hot-dip galvanized zinc coating), electrogalvanizing (electrogalvanized zinc coating), or galvannealing (galvanneal zinc-iron alloy), typically to a thickness of between 2 µm to 50 µm, although other procedures and thicknesses of the attained coating(s) may be employed. Some examples of a suitable aluminum-based material include aluminum, an aluminum-silicon alloy, an aluminum-zinc alloy, and an aluminum-magnesium alloy. A coating of an aluminum-based material may be applied by dip coating, typically to a thickness of 2 µm to 30 µm, although other coating procedures and thicknesses of the attained coating(s) may be employed. Taking into the account the thicknesses of the steel base layers 36, 38 and their optional surface coating(s) 40, the overall thickness of each of the first and second steel workpieces 12, 14 preferably ranges from 0.4 mm to 4.0 mm, or more narrowly from 0.5 mm to 2.0 mm, within the welding region 16.

If the first and second metal base layers 36, 38 are composed of aluminum, each of the metal base layers 36, 38 (referred to for the moment as the first and second aluminum base layers 36, 38) may be separately composed of unalloyed aluminum or an aluminum alloy that includes at least 85 wt % aluminum. Some notable aluminum alloys that may constitute the first and/or second aluminum base layers 36, 38 are an aluminum-magnesium alloy, an aluminum-silicon alloy, an aluminum-magnesium-silicon alloy, or an aluminum-zinc alloy. Additionally, each of the aluminum base layers 36, 38 may be separately provided in wrought or cast form. For example, each of the aluminum base layers 36, 38 may be composed of a 4xxx, 5xxx, 6xxx, or 7xxx series wrought aluminum alloy sheet layer, extrusion, forging, or other worked article, or a 4xx.x, 5xx.x, or 7xx.x series aluminum alloy casting. Some more specific kinds of aluminum alloys that can be used as the first and/or second aluminum base layers 36, 38 include AA5182 and AA5754 aluminum-magnesium alloy, AA6011 and AA6022 aluminum-magnesium-silicon alloy, AA7003 and AA7055 aluminum-zinc alloy, and Al-10Si-Mg aluminum die casting alloy. The first and/or second aluminum base layers 36, 38 may be employed in a variety of tempers including annealed (O), strain hardened (H), and solution heat treated (T).

The surface coating 40 present on one or both of the aluminum base layers 36, 38 may be a native refractory oxide coating comprised of aluminum oxide compounds that forms passively when fresh aluminum from the aluminum base layer 36, 38 is exposed to atmospheric air or some other oxygen-containing medium. The surface coating 40 may also be a metallic coating comprised of zinc or tin, or it may be a metal oxide conversion coating comprised of oxides of titanium, zirconium, chromium, or silicon as disclosed in U.S. Patent Application No. US2014/0360986. A typical thickness of the surface coating 40, if present, lies anywhere from 1 nm to 10 μm depending on the composition of the coating 40 and the manner in which the coating is derived, although other thicknesses may be employed. Passively formed refractory oxide coatings, for example, often have thicknesses that range from 2 nm to nm when the underlying aluminum material is an aluminum alloy. Taking into account the thicknesses of the aluminum base layers 36, 38 and their optional surface coating(s) 40, the overall thickness of each of the first and second aluminum workpieces 12, 14 preferably ranges of 0.4 mm to 6.0 mm, or more narrowly from 0.5 mm to 3.0 mm, within the welding region 16.

If the first and second metal base layers 36, 38 are composed of magnesium, each of the metal base layers 36, 38 (referred to for the moment as the first and second magnesium base layers 36, 38) may be separately composed of unalloyed magnesium or a magnesium alloy that includes at least 85 wt % magnesium. Some notable magnesium alloys that may constitute the first and/or second magnesium base layers 36, 38 are a magnesium-zinc alloy, a magnesium-aluminum alloy, a magnesium-aluminum-zinc alloy, a magnesium-aluminum-silicon alloy, and a magnesium-rare earth alloy. Additionally, each of the magnesium base layers 36, 38 may be separately provided in wrought (sheet, extrusion, forging, or other worked article) or cast form. A few specific examples of magnesium alloys that can be used as the first and/or second magnesium base layers 36, 38 include, but are not limited to, AZ91D die cast or wrought (extruded or sheet) magnesium alloy, AZ31B die cast or extruded (extruded or sheet) magnesium alloy, and AM60B die cast magnesium alloy. The first and/or second magnesium base layers 36, 38 may be employed in a variety of tempers including annealed (O), strain hardened (H), and solution heat treated (W).

The surface coating 40 present on one or both of the magnesium base layers 36, 38 may be a native refractory oxide coating comprised of magnesium oxide compounds (and possibly magnesium hydroxide compounds) that forms passively when fresh magnesium from the magnesium base layer 36, 38 is exposed to atmospheric air or some other oxygen-containing medium. The surface coating 40 may also be a metallic conversion coating comprised of metal oxides, metal phosphates, or metal chromates. A typical thickness of the surface coating 40, if present, lies anywhere from 1 nm to 10 μm depending on the composition of the coating 40 and the manner in which the coating 40 is derived, although other thicknesses may be employed. Passively formed refractory oxide coatings, for example, often have thicknesses that range from 2 nm to 10 nm when the underlying magnesium material is a magnesium alloy. Taking into account the thicknesses of the magnesium base layers 36, 38 and their optional surface coating(s) 40, the overall thickness of each of the first and second magnesium workpieces 12, 14 preferably ranges of 0.4 mm to 6.0 mm, or more narrowly from 0.5 mm to 3.0 mm, within the welding region 16.

Referring back to FIG. 1, the remote laser welding apparatus 18 includes a scanning optic laser head 42. Generally speaking, the scanning optic laser head 42 directs the transmission of the laser beam 24 towards the top surface 20 of the workpiece stack-up 10 (also the exterior outer surface 26 of the first metal workpiece 12). The directed laser beam 24 has a beam spot 44, which, as shown in FIG. 2, is the sectional area of the laser beam 24 at a plane oriented along the top surface 20 of the stack-up 10. The scanning optic laser head 42 is preferably mounted to a robotic arm (not shown) that can quickly and accurately carry the laser head 42 to many different preselected locations within the welding region 16 in rapid programmed succession. The laser beam 24 used in conjunction with the scanning optic laser head 42 is preferably a solid-state laser beam operating with a wavelength in the near-infrared range (commonly considered to be 700 nm to 1400 nm) of the electromagnetic spectrum. Additionally, the laser beam 24 has a power level capability that can attain a power density sufficient to produce a keyhole, if desired, within the workpiece stack-up 10 during formation of the laser weld joint. The power density needed to produce a keyhole within the overlapping metal workpieces 12, 14 is typically between 0.5-1.5 MW/cm$^2$, depending on the compositions of the metal base layers 36, 38.

Some examples of a suitable solid-state laser beam that may be used in conjunction with the remote laser welding apparatus 18 include a fiber laser beam, a disk laser beam, and a direct diode laser beam. A preferred fiber laser beam is a diode-pumped laser beam in which the laser gain medium is an optical fiber doped with a rare earth element (e.g., erbium, ytterbium, neodymium, dysprosium, praseodymium, thulium, etc.). A preferred disk laser beam is a diode-pumped laser beam in which the gain medium is a thin laser crystal disk doped with a rare earth element (e.g., a ytterbium-doped yttrium-aluminum garnet (Yb:YAG) crystal coated with a reflective surface) and mounted to a heat sink. And a preferred direct diode laser beam is a combined laser beam (e.g., wavelength combined) derived from multiple diodes in which the gain medium is multiple semiconductors such as those based on aluminum gallium arsenide (AlGaAS) or indium gallium arsenide (InGaAS). Laser generators that can generate each of those types of lasers as well as other variations are commercially available. Other solid-state laser beams not specifically mentioned here may of course be used.

The scanning optic laser head 42 includes an arrangement of mirrors 46 that can maneuver the laser beam 24 and thus convey the beam spot 44 along the top surface 20 of the workpiece stack-up 10 within an operating envelope 48 that at least partially spans the welding region 16. Here, as illustrated in FIG. 1, the portion of the top surface 20 spanned by the operating envelope 48 is labeled the x-y plane since the position of the laser beam 24 within the plane is identified by the "x" and "y" coordinates of a three-dimensional coordinate system. In addition to the arrangement of mirrors 46, the scanning optic laser head 42 also includes a z-axis focal lens 50, which can move a focal point 52 (FIG. 2) of the laser beam 24 along a longitudinal axis 54 of the laser beam 24 to thus vary the location of the focal point 52 in a z-direction oriented perpendicular to the x-y plane in the three-dimensional coordinate system established in FIG. 1. Furthermore, to keep dirt and debris from adversely affecting the optical system components and the integrity of the laser beam 24, a cover slide 56 may be situated below the scanning optic laser head 42. The cover slide 56 protects the arrangement of mirrors 46 and the z-axis focal lens 50 from the surrounding environment yet allows the laser beam 24 to pass out of the scanning optic laser head 42 without substantial disruption.

The arrangement of mirrors 46 and the z-axis focal lens 50 cooperate during operation of the remote laser welding apparatus 18 to dictate the desired movement of the laser beam 24 and its beam spot 44 within the operating envelope 48 as well as the position of the focal point 52 along the longitudinal axis 54 of the beam 24. The arrangement of mirrors 46, more specifically, includes a pair of tiltable scanning mirrors 58. Each of the tiltable scanning mirrors 58 is mounted on a galvanometer 60. The two tiltable scanning mirrors 58 can move the location of the beam spot 44—and thus change the point at which the laser beam 24 intersects the workpiece stack-up 10—anywhere in the x-y plane of the operating envelope 48 through precise coordinated tilting movements executed by the galvanometers 60. At the same time, the z-axis focal lens 50 controls the location of the focal point 52 of the laser beam 24 in order to help administer the laser beam 24 at the correct power density and to attain the desired heat input both instantaneously and over time. All of these optical components 50, 58 can be rapidly indexed in a matter of milliseconds or less to advance the beam spot 44 of the laser beam 24 relative to the x-y plane of the top surface 20 of the workpiece stack-up 10 along the multiple weld path(s) described more fully below while controlling the location of the focal point 52.

A characteristic that differentiates remote laser welding from other conventional forms of laser welding is the focal length of the laser beam 24. Here, as shown in FIG. 1, the laser beam 24 has a focal length 62, which is measured as the distance between the focal point 52 and the last tiltable scanning mirror 58 that intercepts and reflects the laser beam 24 prior to the laser beam 24 exiting the scanning optic laser head 42. The focal length 62 of the laser beam 24 is preferably in the range of 0.4 meters to 2.0 meters with a diameter of the focal point 52 typically ranging anywhere from 100 μm to 700 μm. The focal length, as well as a focal distance 64, can be easily adjusted. The term "focal distance" as used herein refers to the distance between the focal point 52 of the laser beam 24 and the top surface 20 of the workpiece stack-up 10 along the longitudinal axis 54 of the beam 24, as shown best in FIG. 2. The focal distance 64 of the laser beam 24 is thus zero when the focal point 52 is positioned at the top surface 20 of the stack-up 10.

The term "focal position" is related to the focal distance 64 of the laser beam 24 and defines where the focal point 52 is positioned relative to the top surface of the workpiece stack-up. To be sure, when the focal point 52 of the laser beam 24 is positioned at the top surface 20 of the workpiece stack-up 10, the focal position of the laser beam 24 is zero (or "0") and, logically, the focal distance 64 is also zero as noted above. When the focal point 52 of the laser beam 24 is located above the top surface of the workpiece stack-up 10, the focal position of the laser beam 24 is the focal distance 64 reported as a positive value (+). Likewise, when the focal point 52 of the laser beam 24 is located below the top surface 20 of the workpiece stack-up, the focal position of the laser beam 24 is the focal distance 64 reported as a negative value (−). The focal position of the laser beam 24 thus gives an indication of not only the focal distance 64 but also the direction along the longitudinal axis 54 of the laser beam 24 in which the focal point 52 is displaced away from the top surface 20 of the workpiece stack-up 10. Stated differently, the absolute value of the focal position of the laser beam 24 is simply the focal distance 64.

In the presently disclosed laser welding method, and referring now to FIGS. 1-19, a laser weld joint 66 (FIG. 16) is formed in the workpiece stack-up 10 by advancing the beam spot 44 of the laser beam 24 along multiple overlapping weld paths such that the metal workpieces 12, 14 are momentarily melted at a predetermined weld location within the welding region 16. To form the laser weld joint 66, the laser beam 24 is directed by the scanning optic laser head 42 at the top surface 20 of the workpiece stack-up. The resultant impingement of the top surface 20 of the stack-up 10 by the laser beam 24 creates a molten metal weld pool 68 within the stack-up 10, as shown in FIG. 3, that penetrates into the stack-up 10 from the top surface 20 towards the bottom surface 22 and that may or may not initially intersect the faying interface 34 established between the first and second metal workpieces 12, 14. Indeed, in the 2T stack-up shown in FIG. 3, the molten metal weld pool 68 may partially or fully penetrate the workpiece stack-up 10. A fully penetrating molten metal weld pool 68 penetrates entirely through the workpiece stack-up 10 and breaches the bottom surface 22 of the stack-up 10, as shown, while a partially penetrating molten metal weld pool 68 penetrates to some intermediate depth between the top and bottom surfaces 20, 22 and therefore does not extend to or breach the bottom surface 22 of the stack-up 10.

The laser beam 24, moreover, preferably has a power density sufficient to vaporize the metal workpieces 12, 14 of the workpiece stack-up 10 directly beneath the beam spot 44. This vaporizing action produces a keyhole 70, also depicted in FIG. 3, which is a column of vaporized workpiece metal that oftentimes contains plasma. The keyhole 70 is formed within the molten metal weld pool 68 and exerts an outwardly-directed vapor pressure sufficient to prevent the surrounding molten metal weld pool 68 from collapsing inward. And, like the molten metal weld pool 68, the keyhole 70 also penetrates into the workpiece stack-up 10 from the top surface 20 towards the bottom surface 22 and may or may not initially intersect the faying interface 34 established between the first and second metal workpieces 12, 14. The keyhole 70 provides a conduit for the laser beam 24 to deliver energy down into the workpiece stack-up 10, thus facilitating relatively deep and narrow penetration of the molten metal weld pool 68 into the workpiece stack-up 10. The keyhole 70 may fully (as shown) or partially penetrate the workpiece stack-up 10 along with the molten metal weld pool 68. In many instances, a power density of 0.5 MW/cm$^2$ to 1.5 MW/cm$^2$ is sufficient to produce the keyhole 70.

Figure 4:
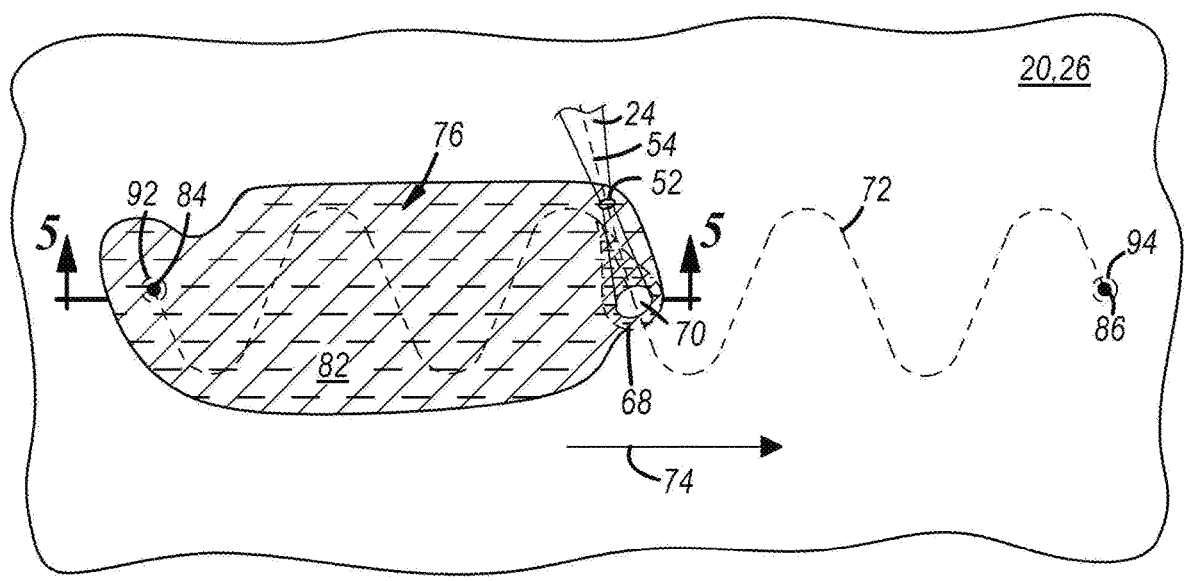
FIG. 4 is a plan view of the top surface of the workpiece stack-up and the laser beam shown in FIG. 1 while a beam spot of the laser beam is being advanced along a first weld path in a first direction according to one embodiment of the present disclosure to form an elongated melt puddle within the workpiece stack-up.
Figure 5:
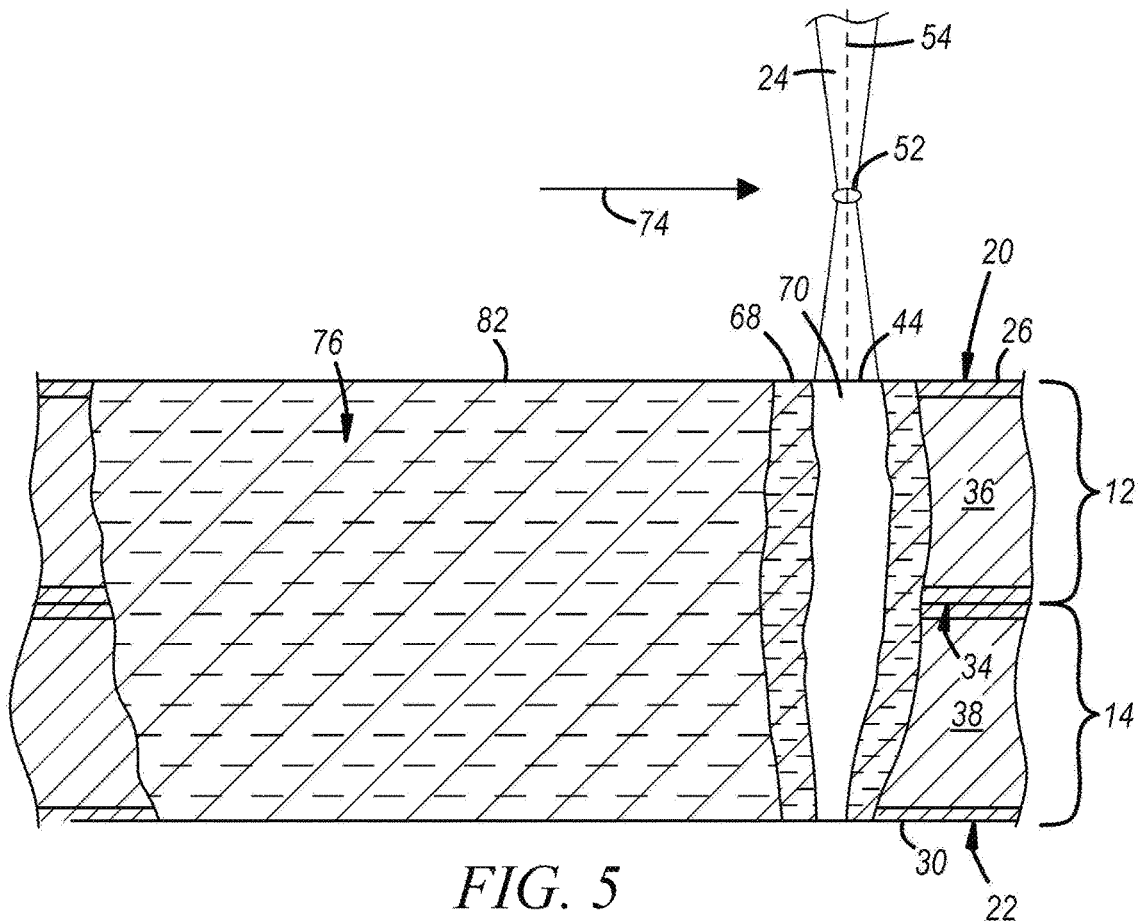
FIG. 5 is a cross-sectional view of the workpiece stack-up and the elongated melt puddle shown in FIG. 4 taken at sectional lines 5-5.

Upon creating the molten metal weld pool 68 and preferably the keyhole 70, the laser beam 24—and, in particular, its beam spot 44—is advanced along a first weld path 72 relative to the top surface 20 of the workpiece stack-up 10 in a first direction 74, as illustrated in FIGS. 4-5. Such advancement of the laser beam 24 translates the molten weld pool 68 and, if present, the keyhole 70, through the workpiece stack-up 10 to form an elongated melt puddle 76 that contains penetrating molten workpiece material. The elongated melt puddle 76 preferably penetrates far enough into or through the workpiece stack-up 10 so that it intersects the faying interface 34 established between the first and second metal workpieces 12, 14. In FIG. 5, for instance, the elongated melt puddle 76 is shown as fully penetrating through the workpiece stack-up 10. In other embodiments, however, the elongated melt puddle 76 may partially penetrate the workpiece stack-up 10 without intersecting the faying interface 34, or it may partially penetrate the workpiece stack-up 10 and intersect the faying interface 34, which, consequently, means the puddle 76 fully traverses the thickness 121 of the first metal workpiece 12 and only partially traverses the thickness 141 of the second metal workpiece 14.

Figure 6:
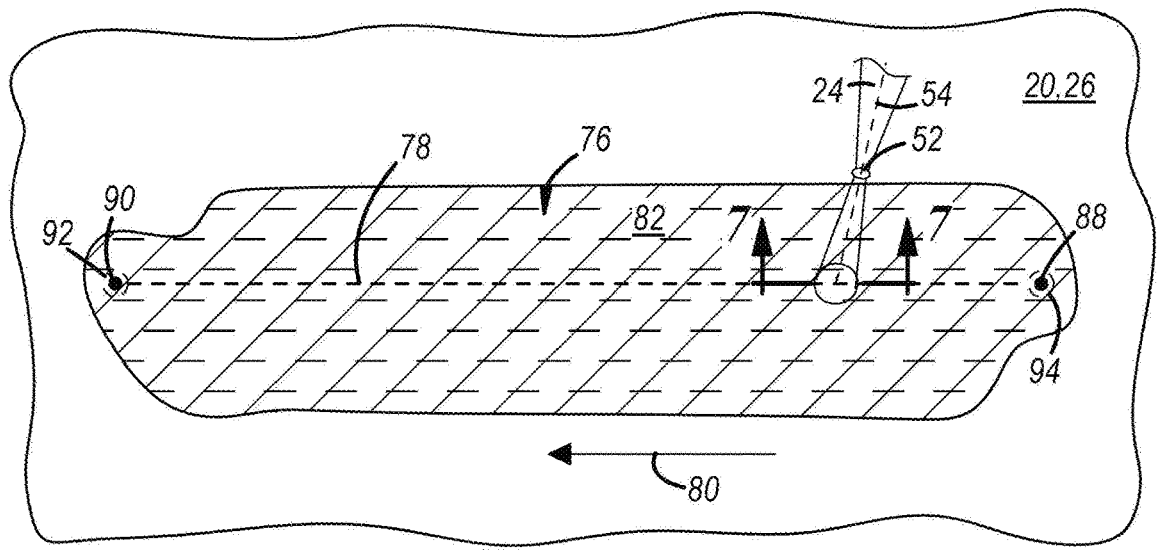
FIG. 6 is a plan view of the top surface of the workpiece stack-up and the laser beam shown in FIG. 1 while a beam spot of the laser beam is being advanced along a second weld path in a second direction, which is oriented opposite to the first direction, according to one embodiment of the present disclosure to convey the laser beam back through the elongated melt puddle previously produced within the workpiece stack-up by advancing the beam spot of the laser beam along the first weld path.
Figure 7:
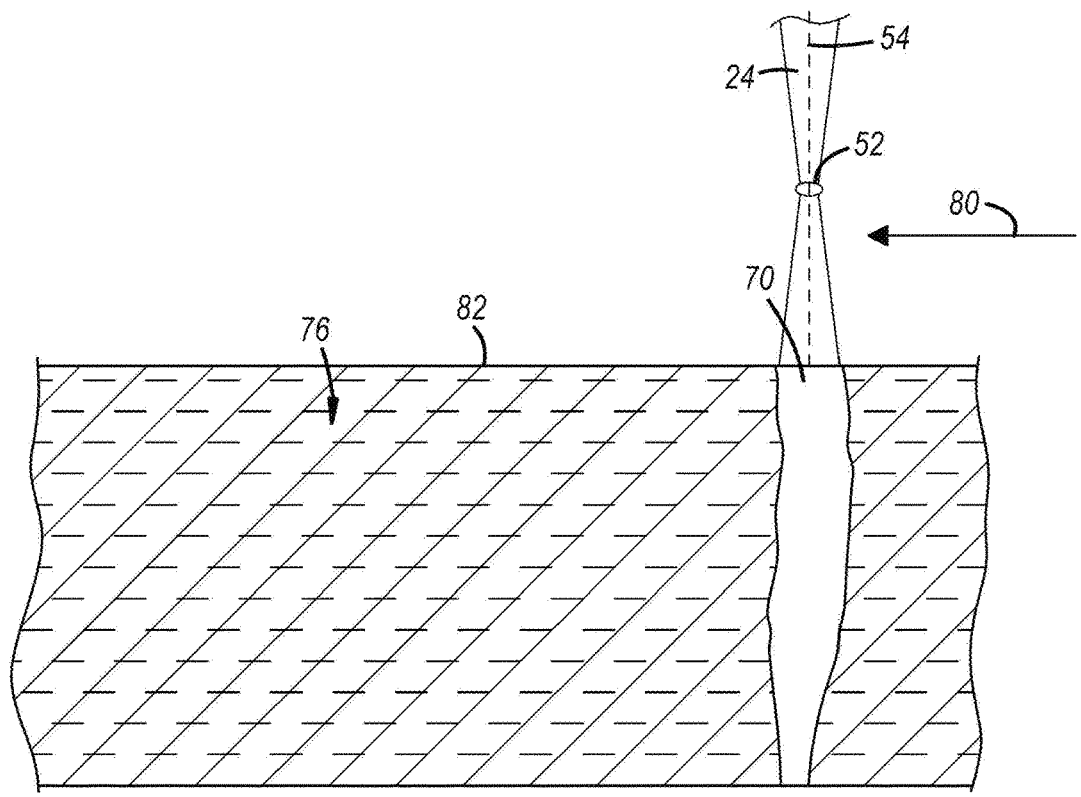
FIG. 7 is a cross-sectional view of the workpiece stack-up and the elongated melt puddle shown in FIG. 6 taken at sectional lines 7-7.

After the laser beam 24 is finished tracing the first weld path 72, and while the elongated melt puddle 76 is still in a molten state (i.e., before the elongated melt puddle 76 has completely solidified), the laser beam 24 is advanced along a second weld path 78 in a second direction 80 oriented opposite to the first direction 74, as illustrated in FIGS. 6-7. The second weld path 78 overlaps with the first weld path 72 to ensure that the laser beam 24 impinges an upper surface 82 of the elongated melt puddle 76 and is conveyed back through the melt puddle 76. The keyhole 70 is preferably present during advancement of the laser beam 24 back through the elongated melt puddle 76 along the second weld path 78, but does not necessarily have to be. By conveying the laser beam 24 back through the elongated melt puddle 76 in the opposite direction in which the puddle 76 was grown, it is possible to work the melt puddle 76 to have a more uniform and consistent distribution of molten workpiece metal with less entrained and/or dissolved vapor (e.g., zinc, hydrogen, water, etc.) so that, upon solidification, the weld joint is instilled with better strength and other properties. Additionally, if needed, the advancement of the laser beam 24 along the second weld path 78 can be controlled to further enlarge the melt puddle 76 so that it adequately intersects the faying interface 34 established between the first and second metal workpieces 12, 14.

The first weld path 72 and the second weld path 78 as traced by the laser beam 24 may assume a variety of geometries as projected onto the top surface 20 of the workpiece stack-up 10 from the vantage of a plan view. The weld paths 72, 78 may be the same or different from one another. As shown in FIGS. 4 and 6, the first weld path 72 may have a starting location 84 and an ending location 86, with the laser beam 24 traveling in the first direction 74 from the starting location 84 to the ending location 86 while being advanced along the first weld path 72. Similarly, the second weld path 78 may have a starting location 88 and ending location 90, with the laser beam 24 traveling in the second direction 80 (opposite from the first direction 74) from the starting location 88 to the ending location 90 while being advanced along the second weld path 78. The starting location 84 of the first weld path 72 and the ending location 90 of the second weld path 78 may be the same location on the top surface 20 or they may be offset. Likewise, the starting location 88 of the second weld path 78 and the ending location 86 of the first weld path 72 may be the same location on the top surface 20 or they may be offset.

In one particular embodiment, a first fixed location 92 may constitute the starting location 84 of the first weld path 72 and the ending location 90 of the second weld path 78, and a second fixed location 94 may constitute the starting location 88 of the second weld path 78 and the ending location 86 of the first weld path 72. In this way, the laser beam 24 may be advanced in the first direction 74 from the first fixed location 92 to the second fixed location 94 along the first weld path 72, then may be advanced in the second direction 80 from the second fixed location 94 back to the first fixed location 92 along the second weld path 78, and then may optionally be advanced again in the first direction 74 along an optional third weld path as will be further explained below. Advancing the laser beam 24 back-and-forth between the first and second fixed locations 92, 94 and along the first and second weld paths 72, 78 may be a practical implementation of the disclosed method since the transmission of the laser beam 24 into the workpiece stack-up 10 does not have to be interrupted when transitioning from the first weld path 72 to the second weld path 78 and the welding operation may be easier to program and control compared to implementations where the starting and/or ending locations 84, 86, 88, 90 of the first and second weld paths 72, 78 are offset from one another on the top surface 20 of the workpiece stack-up 10.

Figure 8:
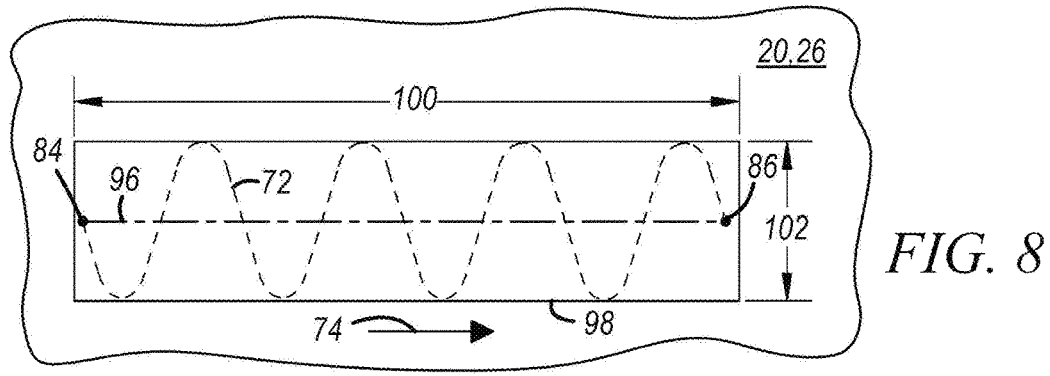
FIG. 8 is a plan view of the first weld path as projected onto the top surface of the workpiece stack-up according to one embodiment of the present disclosure.
Figure 9:
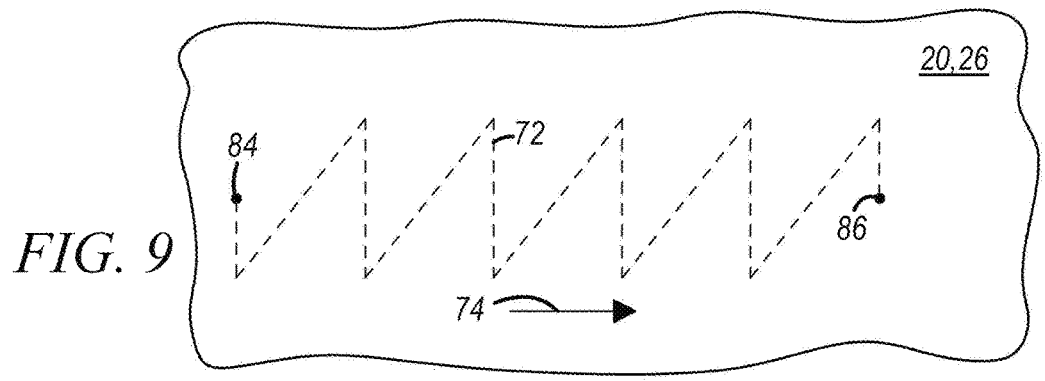
FIG. 9 is a plan view of the first weld path as projected onto the top surface of the workpiece stack-up according to another embodiment of the present disclosure.
Figure 10:
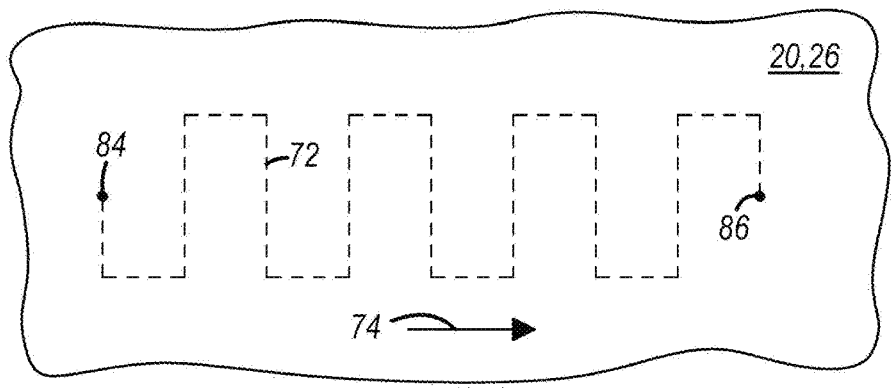
FIG. 10 is a plan view of the first weld path as projected onto the top surface of the workpiece stack-up according to yet another embodiment of the present disclosure.
Figure 11:
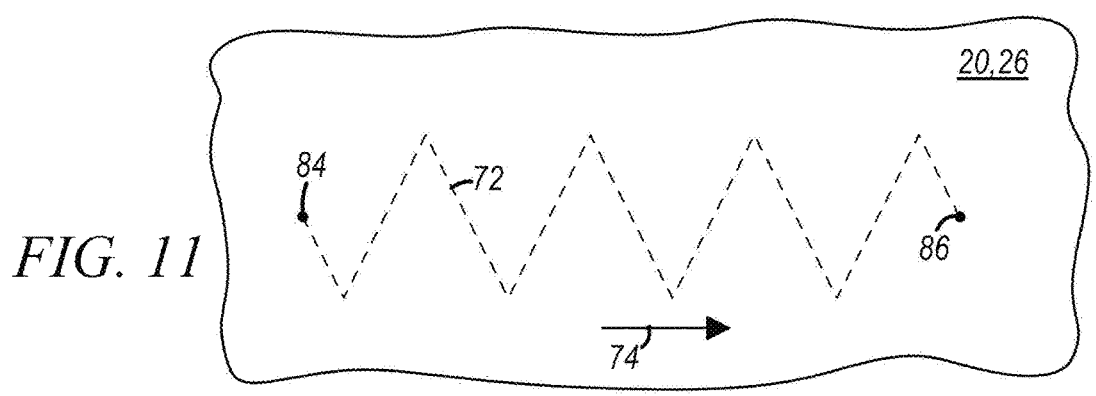
FIG. 11 is a plan view of the first weld path as projected onto the top surface of the workpiece stack-up according to still another embodiment of the present disclosure.
Figure 12:
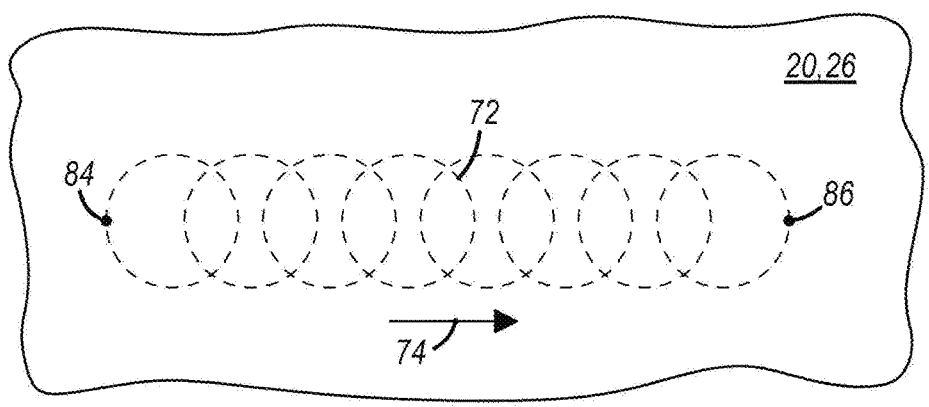
FIG. 12 is a plan view of the first weld path as projected onto the top surface of the workpiece stack-up according to another embodiment of the present disclosure.
Figure 13:
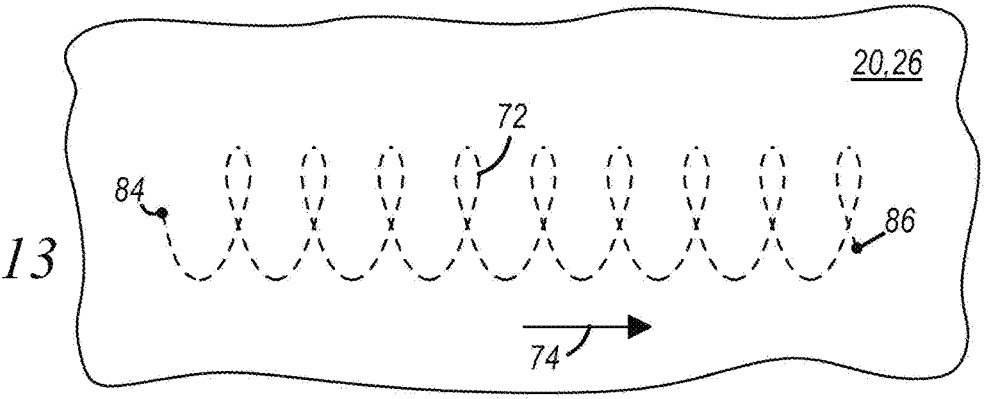
FIG. 13 is a plan view of the first weld path as projected onto the top surface of the workpiece stack-up according to yet another embodiment of the present disclosure.
Figure 14:
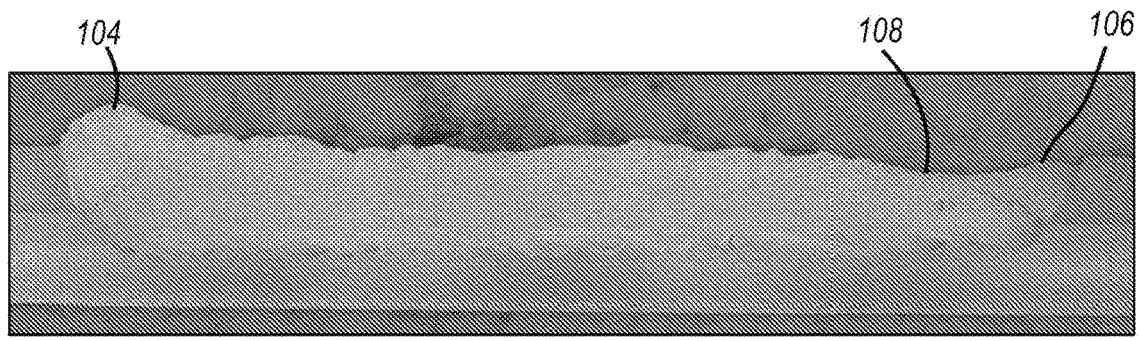
FIG. 14 is a magnified cross-sectional photograph of a weld joint formed between two light metal workpieces according to conventional laser welding practices that do not employ advancing the laser beam along at least first and second weld paths as set forth in the laser welding method of this disclosure.

The first weld path 72 is preferably a weld path that includes lateral variations above and below a mean profile line 96 that runs through the arithmetic center of the weld path 72 parallel to the first direction 74, as shown in FIG. 8. For example, the first weld path 72 may be a periodic waveform or an aperiodic waveform. A periodic waveform is a waveform that includes recurring individual wave segments that repeat themselves at regular intervals, and an aperiodic waveform is a waveform that is not periodic. Some specific examples of suitable periodic waveforms that may be employed as the first weld path 72 include a sinusoidal waveform, as shown here in FIG. 8, as well as those shown in FIGS. 9-13 including a sawtooth waveform (FIG. 9), a square waveform (FIG. 10), and a triangle waveform (FIG. 1), to name but a few. The first weld path 72 may also include other geometric forms including a band of a series of offset intersecting circles, as shown in FIG. 12, or a band of a continuous series of loops, as shown in FIG. 13, of the circular or noncircular variety. Because of its lateral variation, the first weld path 72 can be sized and controlled to have a surface area 98 that covers a swath of the top surface 20 of the workpiece stack-up 10. The surface area 98 (shown representatively only in FIG. 8) of the first weld path 72 is the product of a length dimension 100 and a width dimension 102 of the first weld path 72. In many instances, but not necessarily all, the length dimension 100 may range from 5 mm to 100 mm and the width dimension 102 may range from 0.5 mm to 10 mm.

It should be noted that the elongated melt puddle 76 created by advancing the laser beam 24 along the first weld path 72 is in a "molten state" so long as it has not undergone complete solidification. For instance, when the length dimension 100 of the first weld path 72 is relatively short, such as 15 mm or less and particularly 10 mm or less, the elongated melt puddle 76 may be comprised entirely of molten metal extending from the starting location 84 to the ending location 86 and, consequently, the laser beam 24 may exclusively encounter molten metal when being conveyed back through melt puddle 76 while being advanced along the second weld path 78 between the starting and ending locations 88, 90. In other scenarios, for example, such as when the length dimension 100 of the first weld path 72 is relatively long, such as greater than 15 mm, the elongated melt puddle 76 may begin to solidify near the starting location 84 of the first weld path 72 before the laser beam 24 returns. As such, the melt puddle 76 may include partially solidified or semisolid molten metal extending from the starting location 84 of the first weld path 76 and may further include molten metal extending from the partially solidified molten metal to the ending location 86 of the first weld path 72. Under these circumstances, the laser beam 24 may first encounter molten metal followed by some partially solidified molten metal when being conveyed back through the elongate meld puddle 76 while being advanced along the second weld path 78 between the starting and ending locations 88, 90. In both of the above instances, the elongated melt puddle 76 is in a molten state when the beam spot 44 of the laser beam 24 is advanced along the second weld path 78.

The second weld path 78 may be linear, as shown in FIG. 6, but it can also include lateral variations above and below a mean profile line such as any of the weld paths previously discussed with respect to the first weld path 72. A linear weld path is one that is straight or curvilinear such as, for example, a straight line that runs directly between the starting point 88 and the ending point 90 of the second weld path 78 over the shortest possible distance or a smooth arcuate line that runs between the starting point 88 and the ending point 90 over a somewhat longer distance. A C-shaped weld path is a common example of one that follows and arcuate line and is thus curvilinear. Regardless of its geometric profile, in certain preferred embodiments, at least 80% and preferably all of the second weld path 78 is contained within the surface area 98 of the first weld path 72. In this way, most or all of the energy of the laser beam 24 is available for transfer to the elongated melt puddle 76 and the benefits of advancing the laser beam 24 in a coordinated fashion along the first weld path 72 and the second weld path 78, some of which are discussed in detail below, can be realized most efficiently.

The beam characteristics of the laser beam 24, which include the power level and travel speed and focal position of the laser beam 24, may be tailored during advancement along each of the first and second weld paths 72, 78 to achieve the desired end-result for that particular pass of the laser beam 24 as part of the overall development of the laser weld joint 66. The beam characteristics of the laser beam 24 may be different when being advanced along the first weld path 72 and the second weld path 78. When the first and second metal workpieces 12, 14 are steel workpieces, for example, the laser beam 24 may have a power level that ranges from 1.0 kW to 5.0 kW and a focal position that ranges from −50 mm to −10 mm or from +10 mm to +50 mm while being advanced along the first weld path 72 at a travel speed of 0.5 m/min to 50 m/min. Then, after transitioning from the first weld path 72, the laser beam 24 may have a power level that ranges from 1.0 kW to 10 kW and a focal position that ranges from −5 mm to +5 mm while being advanced along the second weld path 78 at a travel speed of 0.5 m/min to 50 m/min. In another example, when the first and second metal workpieces 12, 14 are aluminum or magnesium workpieces, the laser beam 24 may have a power level that ranges from 2.0 kW to 10 kW and a focal position that ranges from −5 mm to +5 mm while being advanced along the first weld path 72 at a travel speed of 5 m/min to 100 m/min. Then, after transitioning from the first weld path 72, the laser beam 24 may have a power level that ranges from 2.0 kW to 10 kW and a focal position that ranges from −10 to +10 while being advanced along the second weld path 78 at a travel speed of 5 m/min to 50 m/min.

The benefits of advancing the laser beam 24 along the first and second weld paths 72, 78 can be better explained in the context of some specific laser welding applications. For example, if both of the first and second metal workpieces 12, 14 are steel workpieces, and one or both of the steel workpieces includes a zinc-based surface coating, there exists the possibility that zinc vapors generated by the heat of the laser beam 24 will produce a weld joint that includes too much porosity. The disclosed laser welding method can counteract this problem. Specifically, for a workpiece stack-up 10 that includes steel workpieces, advancing the laser beam 24 along the first weld path 72 can boil zinc that may be present along the top surface 20 of the workpiece stack-up and can additionally boil and/or convert into zinc oxides any zinc that may be present along the faying interface 34 and along the bottom surface 22 of the workpiece stack-up during formation of the elongated melt puddle 76. Subsequently advancing the laser beam 24 along the second weld path 78 through the elongated melt puddle 76 then alters the fluid velocity field within the molten workpiece material, which, in turn, disturbs and helps drive off zinc vapors that are trapped within the melt puddle 76. After the laser beam 24 is finished tracing the second weld path 78, the melt puddle 76 is less liable to contain zinc vapors and has a more consistent distribution.

Figure 15:
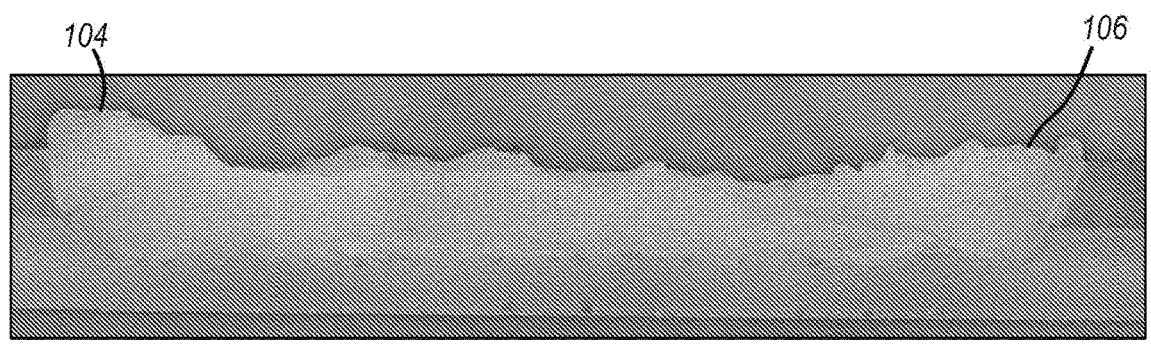
FIG. 15 is a magnified cross-sectional photograph of a weld joint formed between two light metal workpieces according to practices of the disclosed laser welding method.

In another example, if both of the first and second metal workpieces 12, 14 are aluminum workpieces or both of the first and second metal workpieces 12, 14 are magnesium workpieces, there exists a possibility that hydrogen gas and/or water vapor may be introduced into the molten workpiece metal and, ultimately, may lead to a weld joint that includes too much porosity. To that end, advancing the laser beam 24 along the first and second weld paths 72, 78 can help eliminate those gaseous substances from the elongated melt puddle 76 in much the same way as described above for the steel workpieces. Additionally, and referring now to FIGS. 14-15 as a visual aid to the following description, the unidirectional passage of a laser beam from a starting location 104 to an ending location 106 has a tendency to create an elongated melt puddle that solidifies with a concavity 108 adjacent to the ending location 106 of the path of the laser beam due, in part, to the thermal resistivity of the light metal workpieces. Such a concavity may be considered a defect and, especially in certain types of aluminums, may be a source for the initiation of hot-cracking. By advancing the laser beam 24 along the first and second weld paths 72, 78 as called for in the disclosed laser welding method, the elongated melt puddle 76 is more uniformly distributed so that, upon solidification, and as shown in FIG. 15, the concavity that typifies unidirectional laser welding practices is eliminated.

Figure 16:
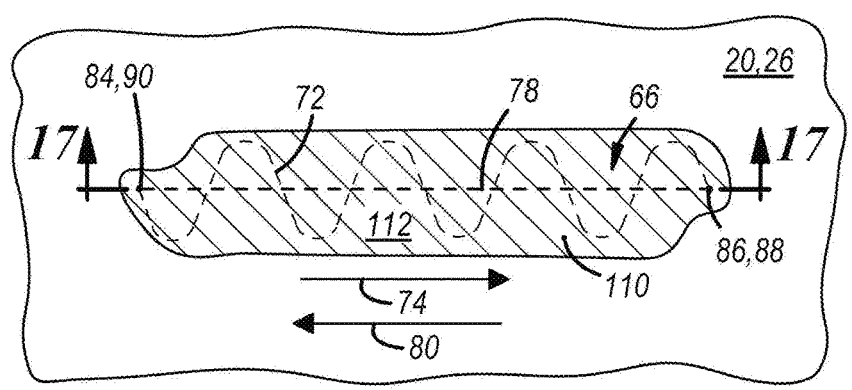
FIG. 16 is a plan view of the workpiece stack-up and a laser joint that has solidified from the elongated melt puddle following removal of the laser beam from the workpiece stack-up after being advanced along the first and second weld paths.
Figure 17:
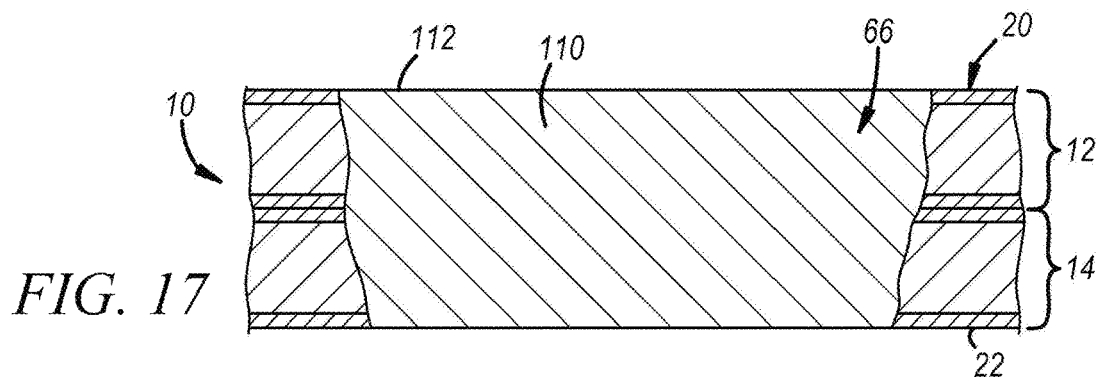
FIG. 17 is a cross-sectional view of the workpiece stack-up and the weld joint shown in FIG. 16 taken at sectional lines 17-17.

Once the beam spot 44 of the laser beam 24 has finished tracing the first and second weld paths 72, 78, the laser beam 24 is removed from the weld location by halting transmission of the laser beam 24 to the workpiece stack-up 10 or simply relocating the laser beam 24 outside of the weld location. The resultant cessation of energy and heat transfer allows the elongated melt puddle 76 to completely solidify into consolidated resolidified workpiece material 110, as shown in FIGS. 16-17. The first weld path 72 and the second weld path 78 are superimposed onto the laser weld joint 66 in dashed lines to help convey their contributions to the laser weld joint 66. The consolidated resolidified workpiece material 110 obtained from the laser beam 24 constitutes the laser weld joint 66, which includes a top surface 112. The laser weld joint 66 extends either fully through or partially into the workpiece stack-up 10 depending on the penetration depth of the preceding elongated melt puddle 76. That is, the laser weld joint 66 extends from the first metal workpiece 12 into the second metal workpiece 14—or more specifically from the top surface 20 of the stack-up 10 towards the bottom surface 22 while intersecting the faying interface 34—so as to autogenously fusion weld the metal workpieces 12, 14 together.

The disclosed laser welding method may additionally include the optional practice of advancing the laser beam 24 along a third weld path 114 to render the top surface 12 of the laser weld joint 66 smoother than it would otherwise be in the absence of implementing the third weld path 114, as illustrated in FIGS. 18-21. Notably, the top surface 112 of the weld joint 66, which is the exposed surface of the joint 66 that is surrounded by the top surface 20 of the workpiece stack-up 10, typically has a tendency to be somewhat coarse due at least in part to the turbulence produced in the elongated melt puddle 76 during the laser welding process and the disturbances caused by gasses being driven from the melt puddle 76. The top surface 112 has a surface roughness, which is measured as a mean or arithmetic average roughness (Ra), that may be as great as 200 μm in certain instances. An overly roughened top surface 112 can have several adverse effects on the visual appearance and/or the structural integrity of the laser weld joint 66. A coarse top surface 112 may give the perception of a poor-quality joint even though the laser weld joint 66 is in fact structurally and functionally sound. Additionally, a coarse top surface 112 may create points of residual stress concentration that are susceptible to cracking and, in particular, stress corrosion cracking when the laser weld joint 66 is subjected to a tensile load in a corrosive environment. Still further, a coarse top surface 112 of the laser weld joint 66 may damage seal strips that are applied over the joint 66 in subsequent manufacturing operations.

Figure 18:
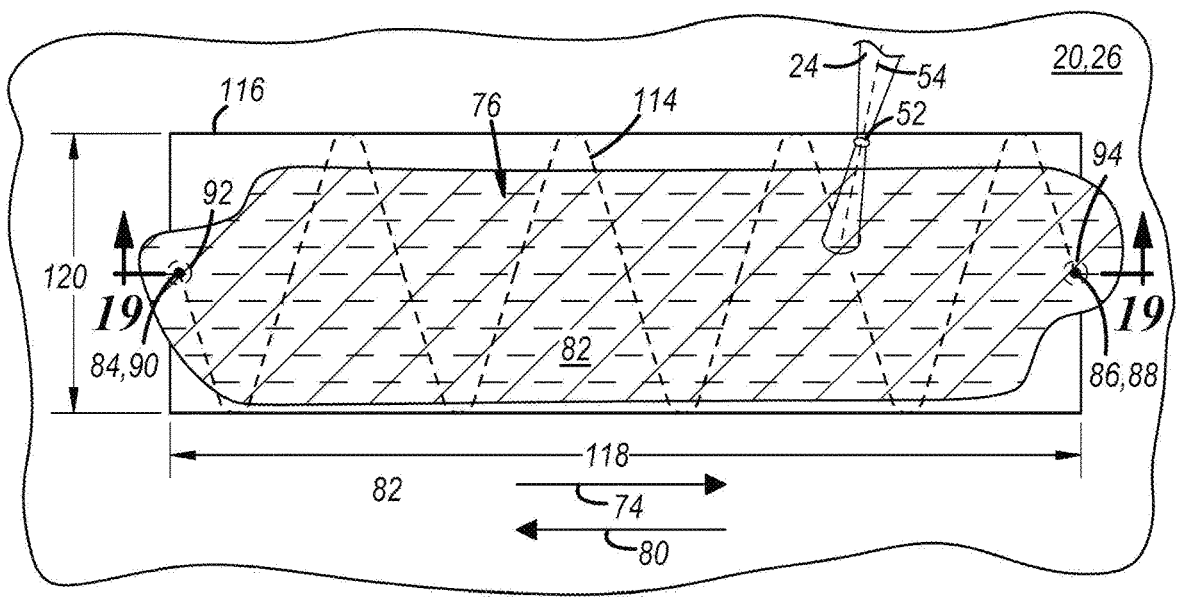
FIG. 18 is a plan view of the workpiece stack-up and the laser beam shown in FIG. 1 while a beam spot of the laser beam is being advanced along a third weld path according to one embodiment of the present disclosure to convey the laser beam back through the elongated melt puddle yet again after the beam spot has been advanced along the second weld path to provide the for a smooth top surface of the laser weld joint.
Figure 19:
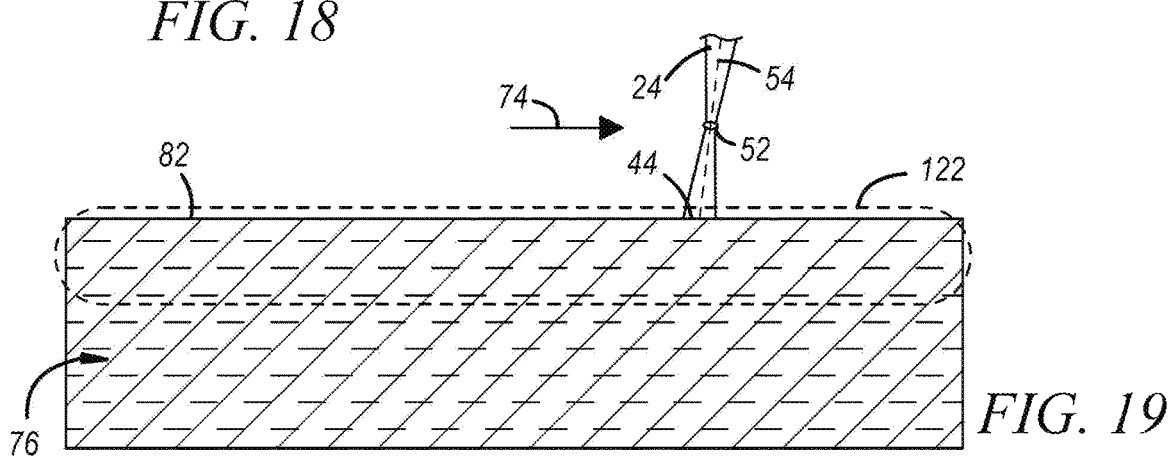
FIG. 19 is a cross-sectional view of the workpiece stack-up and the elongated melt puddle shown in FIG. 18 taken at section lines 19-19.

Advancing the laser beam 24 along the optional third weld path 114 to provide for a smooth the top surface 112 of the laser weld joint 66 may be carried out in one of two ways. In one implementation, as shown in FIGS. 18-19, and following advancement along the second weld path 78, the laser beam 24 may defocused to increase the size of the beam spot 44 by increasing the sectional area of the laser beam 24 at a plane oriented along the top surface 20 of the stack-up 10. This may be accomplished by increasing the focal distance 52 of the laser beam 24 (either positively (+) or negatively (−)) to between 20 mm and 50 mm and/or reducing the power level of the laser beam 24 to between 1.0 kW and 10 kW or, more narrowly to between 3.0 kW and 6.0 kW, so that the keyhole 70 is no longer sustainable. Once defocused, the laser beam 24 is advanced along the third weld path 114 while the elongated melt puddle 76 is still in a molten state (i.e., it has not yet completely solidified) at a travel speed that may range from 10 m/min to 50 m/min.

The third weld path 114 overlaps with the first weld path 72 and the second weld path 78 and, consequently, causes the laser beam 24 to impinge the upper surface 82 of the elongated melt puddle 76 while being conveyed through the melt puddle 76 yet again, in either the first direction 74 or the second direction 80. The third weld path 114 preferably has a surface area 116 that covers at least 90% of and preferably the entire upper surface 82 of the melt puddle 76. The third weld path 114 may assume any of the geometric profiles described above with respect to the first weld path 72, including the sinusoidal waveform shown in FIG. 18, and its surface area 116 may be defined by a length dimension 118 that ranges from 5 mm to 100 mm and a width dimension 120 that ranges from 1 mm to 12 mm. By advancing the laser beam 24 along the third weld path 114, heat is introduced into an upper region 122 of the elongated melt puddle 76 which, in turn, extends the time that the upper region 76, including the upper surface 82, of the melt puddle 76 remains in a molten state, as depicted in FIG. 19. Delaying solidification of the upper region 122 of the elongated melt puddle 76—as opposed to letting it cool and solidify immediately after the laser beam 24 finished tracing the second weld path 78—redistributes energy along the upper surface 82 of the melt puddle 76 and provides enough time for the inherent surface tension of the molten metal to naturally cause the upper surface 82 to settle and flatten out, thus rendering the top surface 112 of the laser weld joint 66 more smooth.

Figure 20:
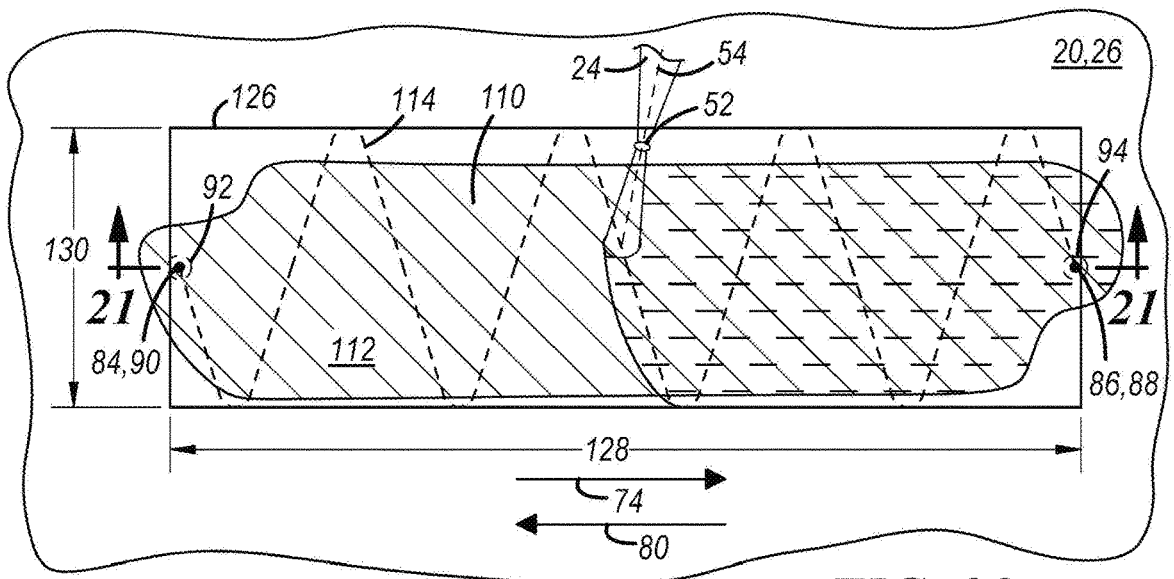
FIG. 20 is a plan view of the workpiece stack-up and the laser beam shown in FIG. 1 while a beam spot of the laser beam is being advanced along a third weld path according to one embodiment of the present disclosure after the laser weld joint has solidified from the elongated melt puddle to remelt the top surface of the laser weld joint and provide a smooth top surface of the laser weld joint.
Figure 21:
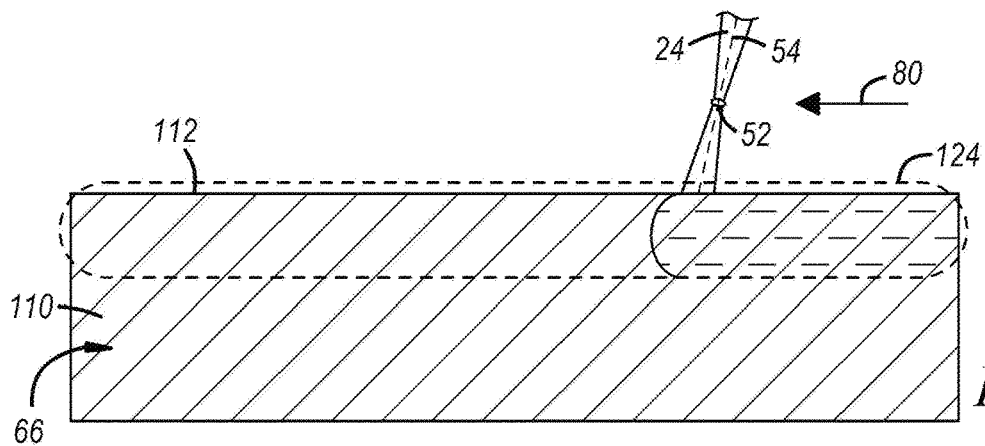
FIG. 21 is a cross-sectional view of the workpiece stack-up and the elongated melt puddle shown in FIG. 20 taken at section lines 21-21.

In another implementation, as shown in FIGS. 20-21, and following advancement along the second weld path 78, the elongated melt puddle 76 is allowed to fully solidify into the laser weld joint 66. Once the laser weld joint 66 is obtained with its top surface 112, the laser beam 24 is advanced along the third weld path 114 in either the first direction 74 or the second direction 80 to remelt a top region 124 of the laser weld joint 66 that includes the top surface 112 of the joint 66, followed by removing the laser beam 24 from the weld location to allow the remelted top region 124 to resolidify. In this scenario, the third weld path 114 overlaps with the first weld path 72 and the second weld path 78 and, consequently, causes the laser beam 24 to impinge the top surface 112 of the laser weld joint 66 while being conveyed through the weld joint 66. When tracing the third weld path, the laser beam 24 may be set to a power level between 1.0 kW and 10 kW or, more narrowly to between 3.0 kW and 6.0 kW, and a focal position between −50 mm and −20 mm or between +20 mm and +50 mm while being advanced at a travel speed that ranges from 10 m/min to 50 m/min.

The third weld path 114 in this embodiment preferably has a surface area 126 that covers at least the entire top surface 112 of the laser weld joint 66. The third weld path 114 may assume any of the geometric profiles described above with respect to the first weld path 72 and its surface area 126 may be defined by a length dimension 128 that ranges from 5 mm to 100 mm and a width dimension 130 that ranges from 1 mm to 12 mm. The surface area 126 may cover at least 90% of and preferably the entire top surface 112 of the laser weld joint 66. By remelting the top region 124 of the laser weld joint 66 after the joint 66 has solidified from the elongated melt puddle 76, the top surface 112 of the joint 66 is reformed; that is, the top surface 112 is momentarily fluidized so that, upon cooling, the inherent surface tension of the molten metal in that region 124 allows the molten metal to settle and flatten out, thus reforming the top surface 112 of the weld joint 66 with a smoother surface profile. While the third weld path 114 is preferably traced by the laser beam 24 immediately after the elongated melt puddle 76 solidifies, such prompt action is not necessarily required, which introduces some process flexibility into the overall laser welding process.

Regardless of how the laser beam 24 is advanced along the optional third weld path 114 to provide for a smooth the top surface 112 of the laser weld joint 66, the results are virtually the same. Not only does the top surface 112 of the laser weld joint 66 have a more aesthetically pleasing appearance than might otherwise be the case, but residual stress concentration points that may be prone to crack initiation and propagation have been removed from the top surface 112 and the joint 66 is less liable to damage seal strips that may be applied over or near the joint 66. In some instances, as a result of advancing the laser beam 24 along the optional third weld path, the surface roughness (Ra) of the top surface 66 may be less than 15 μm, less than 10 μm, less than 5 μm, and even less than 1 μm, all the way down to 0.1 μm. When combined with the effects of advancing the laser beam 24 along the first and second weld paths 72, 78, as described above, the final produced laser weld joint 66 has an overall robust joint structure that autogenously fusion welds the first and second workpieces 12, 14 together with good strength in peel and cross-tension as well as other mechanical properties.

Figure 22:
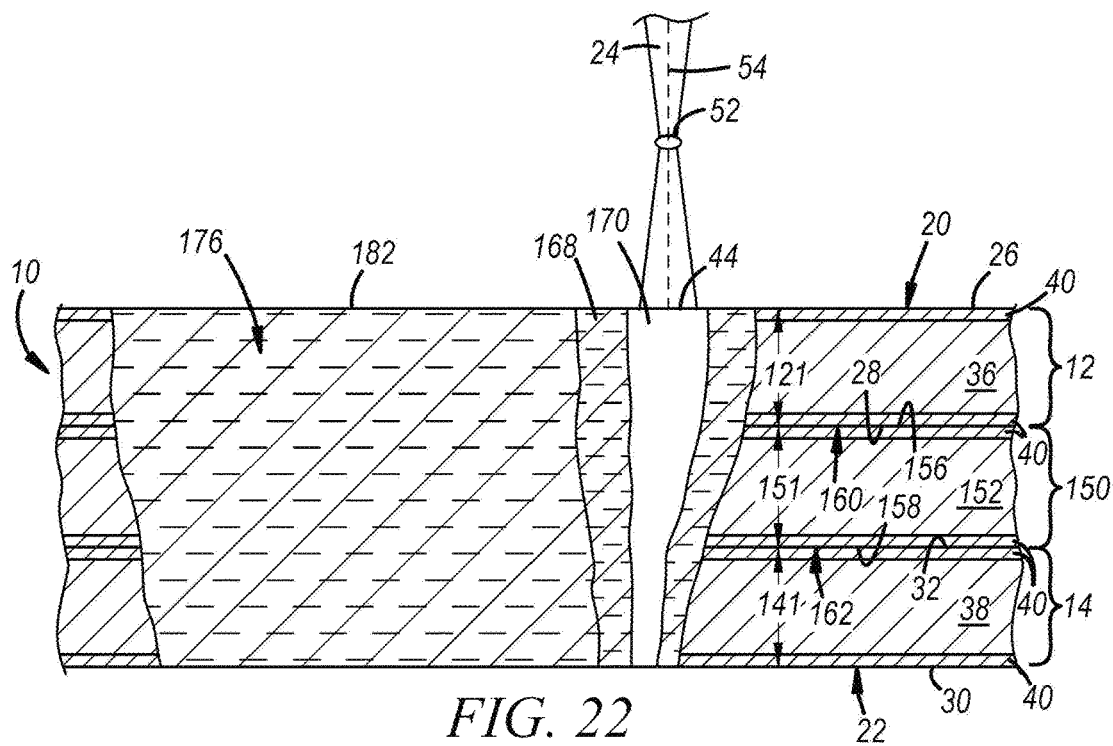
FIG. 22 is a cross-sectional view of view of the workpiece stack-up shown in FIG. 1 according to another embodiment in which the stack-up includes three metal workpieces, instead of two, and further illustrating the laser beam shown in FIG. 1 while a beam spot of the laser beam is being advanced along a first weld path in a first direction according to one embodiment of the present disclosure to form an elongated melt puddle within the workpiece stack-up.
Figure 23:
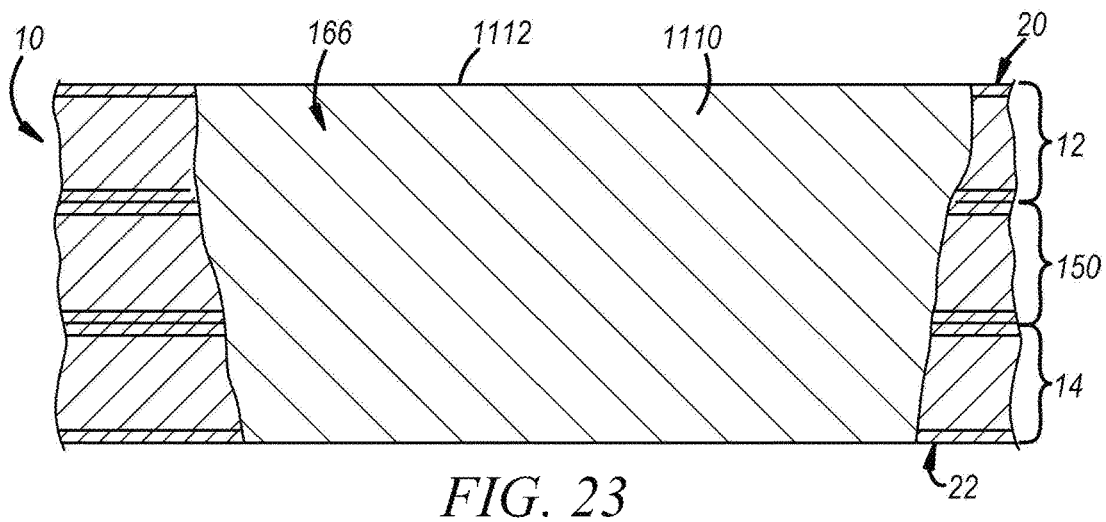
FIG. 23 is cross-sectional view of the same workpiece stack-up shown in FIG. 22 after the laser weld joint has solidified from the elongated melt puddle following removal of the laser beam from the workpiece stack-up after being advanced along the first and second weld paths.

FIGS. 1-21 have been described in the context of an embodiment of the workpiece stack-up 10 that includes two overlapping metal workpieces 12, 14 establishing a single faying interface 34. Of course, as shown in FIGS. 22-23, the disclosed laser welding method may also be practiced on a workpiece stack-up 10 that includes an additional third metal workpiece 150, with a thickness 151, situated between the first and second metal workpieces 12, 14. The third metal workpiece 150, if present, includes a third metal base layer 152 that may also be coated with a surface coating 40 (as shown). The third metal workpiece 150 is similar in many general respects to the first and second metal workpieces 12, 14 and, accordingly, the description of the first and second metal workpieces 12, 14 set forth above (in particular the composition of the metal base layers, their possible surface oxide coatings, and the workpiece thicknesses) applies fully to the third metal workpiece 150. The welding region 16 in this embodiment of the workpiece stack-up 10 is now defined by the extent of the common overlap of all of the first, second, and metal workpieces 12, 14, 150.

As a result of stacking the first, second, and third metal workpieces 12, 14, 150 in overlapping fashion to provide the workpiece stack-up 10, and as shown best in FIG. 22, the third metal workpiece 150 has two faying surfaces: a third faying surface 156 and a fourth faying surface 158. The third faying surface 156 overlaps and confronts the first faying surface 28 of the first metal workpiece 12 and the fourth faying surface 158 overlaps and confronts the second faying surface 32 of the second metal workpiece 14. Within the welding region 16, the confronting first and third faying surfaces 28, 156 of the first and third metal workpieces 12, 150 establish a first faying interface 160 and the confronting second and fourth faying surfaces 32, 158 of the second and third metal workpieces 14, 150 establish a second faying interface 162. These faying interfaces 160, 162 are the same type and encompass the same attributes as the faying interface 34 described above with respect to the 2T stack-up embodiment shown in FIGS. 1 and 3. Consequently, in this embodiment, the exterior outer surfaces 26, 30 of the flanking first and second metal workpieces 12, 14 still face away from each other in opposite directions and constitute the top and bottom surfaces 20, 22 of the workpiece stack-up 10.

The disclosed laser welding method is practiced in the same general way as described above. Using FIG. 4 as a reference to describe FIG. 22, and applying the visual of FIG. 4 for the moment to a 3T stack-up, the laser beam 24 is directed by the scanning optic laser head 42 at the top surface 20 of the workpiece stack-up to create the molten metal weld pool 168 (FIG. 22) within the stack-up 10 and, optionally the keyhole 170 (FIG. 22). Each of the molten metal weld pool 168 and the keyhole 170 penetrates into the stack-up 10 from the top surface 20 towards bottom surface 22. Upon creating the molten metal weld pool 168 and preferably the keyhole 170, the laser beam 24—and, in particular, its beam spot 44—is advanced along the first weld path 72 relative to the top surface 20 of the workpiece stack-up 10 in the first direction 74, as illustrated in FIGS. 4 and 22, and is then advanced along the second weld path 78 in the second direction 80 oriented opposite to the first direction 72, as illustrated in FIG. 6. Following completion of the second weld path, the laser beam 24 may optionally be advanced along the third weld path 114, as illustrated in FIGS. 18 and 20. It should be noted that FIGS. 4, 6, 18, and 20 are being referred to again in this embodiment for convenience because the visuals in each of those drawings from the vantage of a plan perspective is equally applicable to a 3T stack-up in addition to the previously-described 2T stack-up.

The advancement of the laser beam 24 along the first weld path 72, the second weld path 78, and optionally the third weld path 114 is done for the same purpose and has the same functionality as before. In particular, the advancement of the laser beam 24 along the first weld path 72 translates the molten weld pool 168 and, if present, the keyhole 170, through the workpiece stack-up 10 to form an elongated melt puddle 176 that contains penetrating molten workpiece material, as illustrated in FIG. 22. The elongated melt puddle 176 preferably penetrates far enough into or through the workpiece stack-up 10 so that it intersects one, and preferably both (as shown), of the faying interfaces 160, 162 established between the metal workpieces 12, 14, 150. To help with the formation of the weld joint 166 (FIG. 23), the surface area 98 of the first weld path 72, and the corresponding swath of the top surface 20 of the workpiece stack-up 10 covered by the surface area 98, is preferably large enough to contain at least 80% and preferably all of the second weld path 78. This helps ensure that most or all of the energy of the laser beam 24 is available for transfer to the elongated melt puddle 176 and that the benefits of advancing the laser beam 24 in a coordinated fashion along the first and second weld paths 72, 78 can be realized in the best way.

After the laser beam 24 is finished tracing the first weld path 72, and while the elongated melt puddle 176 is still in a molten state (i.e., it has not yet completely solidified), the laser beam 24 is advanced along the second weld path 78 in the second direction 80 oriented opposite to the first direction 74, as illustrated in FIG. 6. Like before, the second weld path 78 overlaps with the first weld path 72 to ensure that the laser beam 24 impinges an upper surface 182 of the elongated melt puddle 176 and is conveyed back through the melt puddle 176. Moreover, if the elongated melt puddle 176 intersects only the first faying interface 160 after advancement of the laser beam 24 along the first weld path 72, and thus does not penetrate far enough into the workpiece stack-up 10 to reach the second faying interface 162, then the advancement of the laser beam 24 along the second weld path 78 needs to introduce enough heat into the melt puddle 176 to enlarge the puddle 176 so that it further penetrates into the stack-up 10 and intersects the second faying interface 162. By conveying the laser beam 24 back through the elongated melt puddle 176 in the opposite direction in which the puddle 176 was grown, it is possible to work the melt puddle 176, as explained above, to instill the laser weld joint 66 with better strength and other properties.

Once the beam spot 44 of the laser beam 24 has finished tracing the first and second weld paths 72, 78, the transmission of the laser beam 24 is halted or the laser beam 24 is otherwise removed from the weld location. The resultant cessation of energy and heat transfer allows the elongated melt puddle 176 to quickly cool and solidify into consolidated resolidified workpiece material 1110, as shown in FIG. 23. As before, the consolidated resolidified workpiece material 1110 obtained from the laser beam 24 constitutes the laser weld joint 166, which has the same basic construction as described above except that it extends into the workpiece stack-up 10 from the top surface 20 of the stack-up 10 towards the bottom surface 22 while intersecting the first and second faying interfaces 160, 162 so as to autogenously fusion weld the three metal workpieces 12, 150, 14 together as opposed to just the two metal workpieces 12, 14 shown in FIG. 17. The laser beam 24 may also optionally be advanced along the third weld path 14 to render the top surface 1112 of the laser weld joint 166 more smooth, if desired, in accordance with either of the two implementations as described above. To that end, the above teachings regarding advancement of the laser beam 24 along the third weld path 1114 as described in regards to the 2T stack-up shown in FIGS. 18-21 are equally applicable to a 3T stack-up and, as such, need not be repeated here in further detail.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of laser welding a workpiece stack-up that includes at least two overlapping metal workpieces, the method comprising:

providing a workpiece stack-up that includes overlapping metal workpieces, the overlapping metal workpieces comprising at least a first metal workpiece and a second metal workpiece that overlaps with the first metal workpiece in a welding region, the first metal workpiece providing a top surface of the workpiece stack-up within the welding region and the second metal workpiece providing a bottom surface of the workpiece stack-up within the welding region, wherein all of the overlapping metal workpieces in the workpiece stack-up are steel workpieces, aluminum workpieces, or magnesium workpieces;

directing a laser beam at the top surface of the workpiece stack-up within the welding region, the laser beam having a beam spot at the top surface of the workpiece stack-up and being maneuverable such that the beam spot can be moved relative to the top surface of the workpiece stack-up; and forming a laser weld joint that extends from the first metal workpiece into the second metal workpiece to autogenously fusion weld the overlapping metal workpieces of the workpiece stack-up together by advancing the beam spot of the laser beam relative to the top surface of the workpiece stack-up along a first weld path in a first direction to form an elongated melt puddle, the first weld path comprising a first length, and then, advancing the beam spot of the laser beam along a second weld path in a second direction that is opposite of the first direction while the elongated melt puddle is still in a molten state, wherein the first weld path and the second weld path overlap so that the beam spot of the laser beam is conveyed through the elongated melt puddle when the beam spot is advanced along the second weld path, and wherein a second length of the second weld path is the same as the first length.

2. The method set forth in claim 1, wherein the first metal workpiece has an exterior outer surface and a first faying surface, and the second metal workpiece has an exterior outer surface and a second faying surface, the exterior outer surface of the first metal workpiece providing the top surface of the workpiece stack-up and the exterior outer surface of the second metal workpiece providing the bottom surface of the workpiece stack-up, and wherein the first and second faying surfaces of the first and second metal workpieces overlap and confront to establish a faying interface.

3. The method set forth in claim 1, wherein the first metal workpiece has an exterior outer surface and a first faying surface, and the second metal workpiece has an exterior outer surface and a second faying surface, the exterior outer surface of the first metal workpiece providing the top surface of the workpiece stack-up and the exterior outer surface of the second metal workpiece providing the bottom surface of the workpiece stack-up, and wherein the workpiece stack-up comprises a third metal workpiece situated between the first and second metal workpieces, the third metal workpiece having opposed third and fourth faying surfaces, the third faying surface overlapping and confronting the first faying surface of the first metal workpiece to establish a first faying interface and the fourth faying surface overlapping and confronting the second faying surface of the second metal workpiece to establish a second faying interface.

4. The method set forth in claim 1, wherein the first weld path includes a mean profile line and lateral variations above and below the mean profile line, the first weld path further having a surface area that covers a swath of the top surface of the workpiece stack-up defined by a product of a length dimension of the first weld path and a width dimension of the first weld path.

5. The method set forth in claim 4, wherein the first weld path is a periodic waveform.

6. The method set forth in claim 4, wherein the first weld path is a band of a series of offset intersecting circles or a band of a continuous series of loops.

7. The method set forth in claim 4, wherein the second weld path is linear and contained within the surface area of the first weld path.

8. The method set forth in claim 7, wherein forming the laser weld joint further comprises advancing the laser beam along a third weld path, which overlaps with each of the first weld path and the second weld path, to provide the laser weld joint with a top surface having a surface roughness (Ra) of 15 µm or less.

9. The method set forth in claim 8, comprising advancing the laser beam along the third weld path, without a keyhole being present, while the elongated melt puddle is still in a molten state so that the laser beam impinges an upper surface of the elongated melt puddle and introduces heat into an upper region of the elongated melt puddle to slow the rate of cooling of the upper surface of the elongated melt puddle so that, upon solidification, the top surface of the laser weld joint is rendered smooth.

10. The method set forth in claim 8, comprising advancing the laser beam along the third weld path after the elongated melt puddle has fully solidified into the laser weld joint so that the laser beam impinges the top surface of the laser weld joint and momentarily remelts a top region of the laser weld joint so that, upon resolidification, the top surface of the laser weld joint is rendered smooth.

11. The method set forth in claim 1, wherein all of the metal workpieces in the workpiece stack-up are steel workpieces.

12. The method set forth in claim 11, wherein at least one of the steel workpieces included in the workpiece stack-up comprises a zinc-based surface coating.

13. The method set forth in claim 1, wherein all of the metal workpieces in the workpiece stack-up are aluminum workpieces.

14. A method of laser welding a workpiece stack-up that includes at least two overlapping metal workpieces, the method comprising:

providing a workpiece stack-up that includes overlapping metal workpieces, the overlapping metal workpieces comprising at least a first metal workpiece and a second metal workpiece that overlaps with the first metal workpiece in a welding region, the first metal workpiece providing a top surface of the workpiece stack-up within the welding region and the second metal workpiece providing a bottom surface of the workpiece stack-up within the welding region, wherein all of the overlapping metal workpieces in the workpiece stack-up are steel workpieces or aluminum workpieces;

operating a remote laser welding apparatus to direct a laser beam at the top surface of the workpiece stack-up within the welding region, the laser beam having a beam spot at the top surface of the workpiece stack-up;

operating the remote laser welding apparatus to advance the beam spot of the laser beam relative to the top surface of the workpiece stack-up along a first weld path in a first direction to form an elongated melt puddle, the first weld path having a surface area that covers a swath of the top surface of the workpiece stack-up;

operating the remote laser welding apparatus to advance the beam spot of the laser beam along a second weld path in a second direction that is opposite of the first direction while the elongated melt puddle is still in a molten state so that the beam spot of the laser beam is conveyed back through the elongated melt puddle, the second weld path being contained within the surface area of the first weld path; and removing the laser beam to allow the elongated melt puddle to solidify into a laser weld joint that extends from the first metal workpiece into the second metal workpiece to autogenously fusion weld the overlapping metal workpieces of the workpiece stack-up together.

15. The method set forth in claim 14, wherein the metal workpieces included in the workpiece stack-up include only the first and second metal workpieces, or wherein the metal workpieces included in the workpiece stack-up further include a third metal workpiece situated between the first and second metal workpieces within the welding region.

16. The method set forth in claim 14, further comprising:
operating the remote laser welding apparatus to advance the beam spot of the laser beam along a third weld path, either before or after the elongated melt puddle has solidified into the laser weld joint, to provide the laser weld joint with a smooth top surface.

17. The method set forth in claim 14, wherein the first weld path is a periodic waveform and the second weld path is linear.

18. The method set forth in claim 14, wherein the elongated melt puddle is enlarged when the beam spot of the laser beam is advanced along the second weld path.

19. A method of laser welding a workpiece stack-up that includes at least two overlapping metal workpieces, the method comprising:
providing a workpiece stack-up that includes overlapping metal workpieces, the overlapping metal workpieces comprising at least a first metal workpiece and a second metal workpiece that overlaps with the first metal workpiece in a welding region, the first metal workpiece providing a top surface of the workpiece stack-up within the welding region and the second metal workpiece providing a bottom surface of the workpiece stack-up within the welding region, wherein all of the overlapping metal workpieces in the workpiece stack-up are steel workpieces, aluminum workpieces, or magnesium workpieces;

advancing a beam spot of a laser beam relative to the top surface of the workpiece stack-up along a first weld path in a first direction to form an elongated melt puddle, the first weld path including a mean profile line and lateral variations above and below the mean profile line and further having a surface area that covers a swath of the top surface of the workpiece stack-up;

advancing the beam spot of the laser beam along a second weld path in a second direction that is opposite of the first direction while the elongated melt puddle is still in a molten state to convey the beam spot back through the elongated melt puddle, the second weld path overlapping with the first weld path so that at least 80% of the second weld path is contained within the surface area of the first weld path; and removing the laser beam to allow the elongated melt puddle to fully solidify into a laser weld joint that extends from the first metal workpiece into the second metal workpiece to autogenously fusion weld the overlapping metal workpieces of the workpiece stack-up together, the laser weld joint having a top surface that has a surface roughness (Ra) of 10 μm or less.

* * * * *